US012682570B2

(12) United States Patent
Chen et al.

(10) Patent No.: US 12,682,570 B2
(45) Date of Patent: Jul. 14, 2026

(54) PRECOMPUTED CELL GENERATION AND DISPLAY METHODS AND SYSTEMS

(71) Applicant: Tencent Technology (Shenzhen) Company Limited, Shenzhen (CN)

(72) Inventors: Lvhao Chen, Shenzhen (CN); Yang Gao, Shenzhen (CN); Junhong Mao, Shenzhen (CN); Haoliang Li, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 148 days.

(21) Appl. No.: 18/914,441

(22) Filed: Oct. 14, 2024

(65) Prior Publication Data

US 2025/0037377 A1 Jan. 30, 2025

Related U.S. Application Data

(63) Continuation of application No. PCT/CN2023/123184, filed on Oct. 7, 2023.

(30) Foreign Application Priority Data

Dec. 23, 2022 (CN) .......................... 202211662938.0

(51) Int. Cl.
*G06T 17/20* (2006.01)
*G06T 15/20* (2011.01)

(52) U.S. Cl.
CPC .............. *G06T 17/20* (2013.01); *G06T 15/20* (2013.01)

(58) Field of Classification Search
CPC ....... G06T 17/20; G06T 15/20; G06T 17/205; A63F 13/5258; G06F 9/451

(Continued)

(56) References Cited

U.S. PATENT DOCUMENTS 10,861,213 B1 * 12/2020 Holzer ...................... G06T 5/70
11,375,527 B1 6/2022 Eyuboglu et al.
(Continued)

FOREIGN PATENT DOCUMENTS

CN 106780696 A 5/2017
CN 113082715 A 7/2021
(Continued)

OTHER PUBLICATIONS

Dec. 23, 2022—(PCT) International Search Report and Written Opinion—PCT/CN2023/123184.

*Primary Examiner* — David T Welch
(74) *Attorney, Agent, or Firm* — Banner & Witcoff, Ltd.

(57) ABSTRACT

This application relates to a precomputed cell display method and apparatus, a computer device, a computer-readable storage medium, and a computer program product. The method includes: displaying, in response to a view space division event triggered for a virtual scene in which a virtual character is located, a limited-view space and a full-view space that are obtained through division in the virtual scene; displaying, corresponding to a navigation mesh of a first space in the limited-view space, a plurality of precomputed cells that extend in a standing direction of the virtual character and that cover the navigation mesh; and displaying, corresponding to a static mesh of a second space in the full-view space, a plurality of precomputed cells that extend in the standing direction of the virtual character and that cover the static mesh of the second space.

20 Claims, 11 Drawing Sheets

(58) Field of Classification Search
USPC .......................................................... 345/419
See application file for complete search history.

(56) References Cited

U.S. PATENT DOCUMENTS

| | | | | |
|---|---|---|---|---|
| 11,417,061 | B1 * | 8/2022 | Feng ........................ | G06T 17/20 |
| 11,602,690 | B2 * | 3/2023 | Zhou ........................ | G06T 15/20 |
| 2017/0277363 | A1 * | 9/2017 | Holzer .................. | G06T 15/205 |
| 2017/0344223 | A1 * | 11/2017 | Holzer .................. | G06V 20/20 |
| 2018/0182178 | A1 * | 6/2018 | Varanasi .............. | H04N 13/246 |
| 2019/0392630 | A1 * | 12/2019 | Sturm ...................... | G06N 3/08 |
| 2020/0228774 | A1 * | 7/2020 | Kar .......................... | G06T 15/08 |
| 2020/0267333 | A1 * | 8/2020 | Li ............................ | G06T 3/40 |
| 2021/0041230 | A1 * | 2/2021 | Natori ............... | G01B 11/2531 |
| 2021/0124475 | A1 * | 4/2021 | Inch ........................ | G06F 3/011 |
| 2022/0051412 | A1 * | 2/2022 | Gronau ............... | G06V 40/172 |
| 2022/0286657 | A1 * | 9/2022 | Oz ........................ | H04N 7/157 |
| 2023/0120253 | A1 * | 4/2023 | Li ........................... | G06T 19/20 |
| | | | | 345/423 |
| 2023/0217001 | A1 * | 7/2023 | Holzer ................ | H04N 13/117 |
| | | | | 348/36 |

FOREIGN PATENT DOCUMENTS

| | | | |
|---|---|---|---|
| CN | 114177613 A | 3/2022 | |
| CN | 115631320 A | 1/2023 | |

* cited by examiner

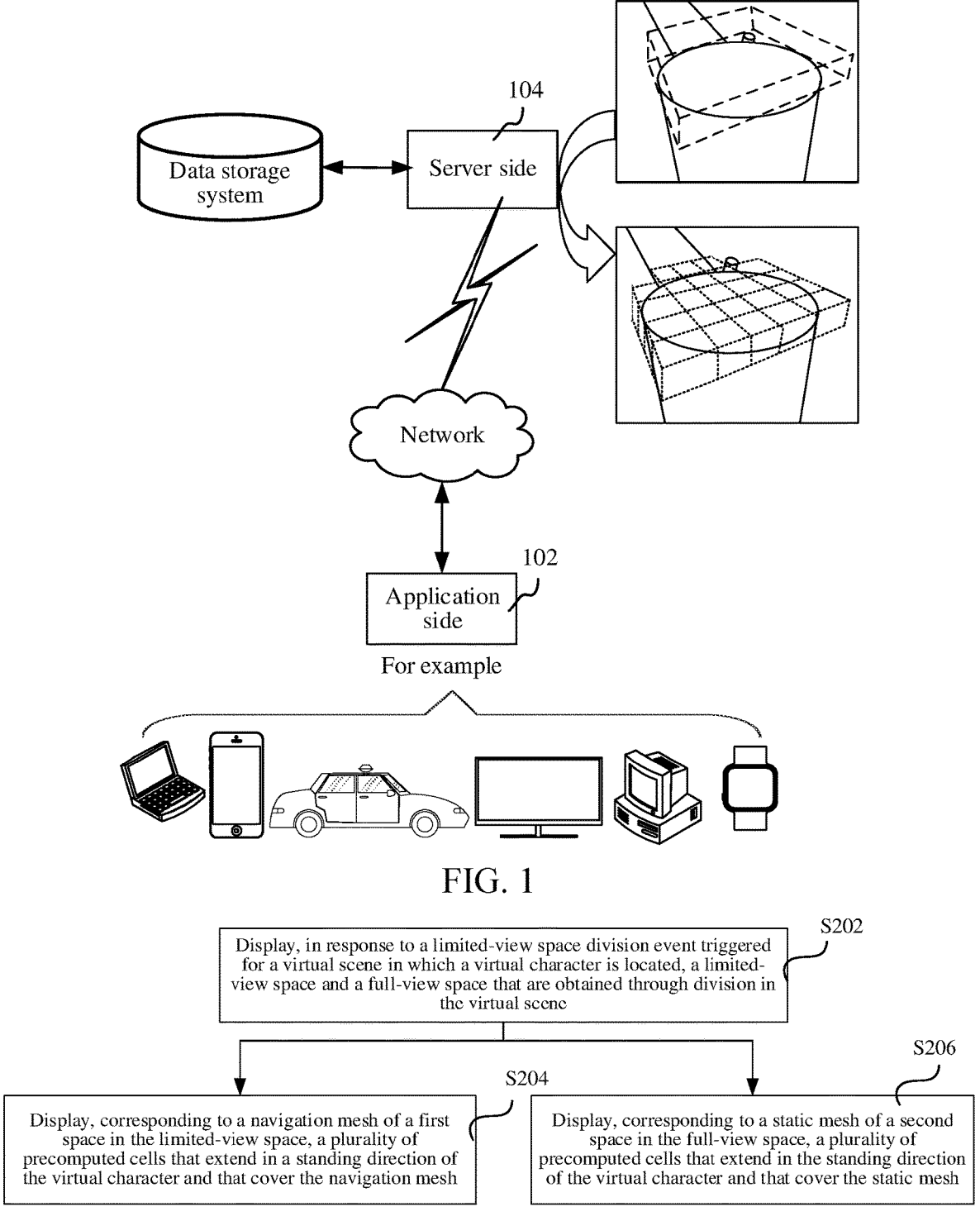

104

Data storage system

Server side

Network

102

Application side

For example

FIG. 1

Display, in response to a limited-view space division event triggered for a virtual scene in which a virtual character is located, a limited-view space and a full-view space that are obtained through division in the virtual scene

S202

Display, corresponding to a navigation mesh of a first space in the limited-view space, a plurality of precomputed cells that extend in a standing direction of the virtual character and that cover the navigation mesh

S204

Display, corresponding to a static mesh of a second space in the full-view space, a plurality of precomputed cells that extend in the standing direction of the virtual character and that cover the static mesh

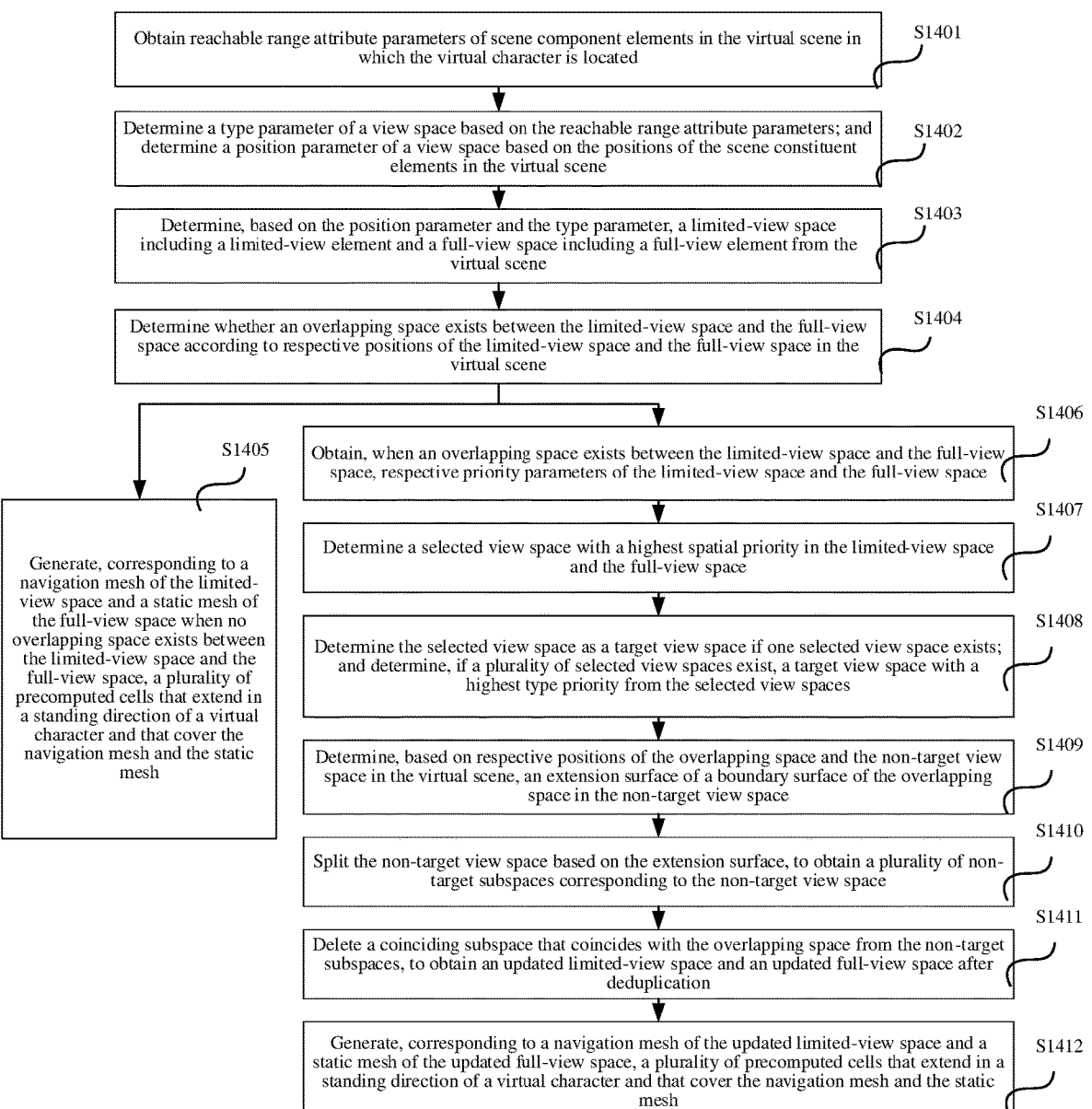

Obtain reachable range attribute parameters of scene component elements in the virtual scene in which the virtual character is located          S1401

Determine a type parameter of a view space based on the reachable range attribute parameters; and determine a position parameter of a view space based on the positions of the scene constituent elements in the virtual scene          S1402

Determine, based on the position parameter and the type parameter, a limited-view space including a limited-view element and a full-view space including a full-view element from the virtual scene          S1403

Determine whether an overlapping space exists between the limited-view space and the full-view space according to respective positions of the limited-view space and the full-view space in the virtual scene          S1404

S1405

Generate, corresponding to a navigation mesh of the limited-view space and a static mesh of the full-view space when no overlapping space exists between the limited-view space and the full-view space, a plurality of precomputed cells that extend in a standing direction of a virtual character and that cover the navigation mesh and the static mesh S1406
Obtain, when an overlapping space exists between the limited-view space and the full-view space, respective priority parameters of the limited-view space and the full-view space S1407
Determine a selected view space with a highest spatial priority in the limited-view space and the full-view space S1408
Determine the selected view space as a target view space if one selected view space exists; and determine, if a plurality of selected view spaces exist, a target view space with a highest type priority from the selected view spaces S1409
Determine, based on respective positions of the overlapping space and the non-target view space in the virtual scene, an extension surface of a boundary surface of the overlapping space in the non-target view space S1410
Split the non-target view space based on the extension surface, to obtain a plurality of non-target subspaces corresponding to the non-target view space S1411
Delete a coinciding subspace that coincides with the overlapping space from the non-target subspaces, to obtain an updated limited-view space and an updated full-view space after deduplication S1412
Generate, corresponding to a navigation mesh of the updated limited-view space and a static mesh of the updated full-view space, a plurality of precomputed cells that extend in a standing direction of a virtual character and that cover the navigation mesh and the static mesh

FIG. 14

PRECOMPUTED CELL GENERATION AND DISPLAY METHODS AND SYSTEMS

CROSS REFERENCE TO RELATED APPLICATIONS

This application is a continuation application of PCT Application PCT/CN2023/123184, filed Oct. 7, 2023, which claims priority to Chinese Patent Application No. 202211662938.0 filed on Dec. 23, 2022, each entitled "PRE-COMPUTED CELL DISPLAY METHOD AND APPARATUS, AND PRECOMPUTED CELL GENERATION METHOD AND APPARATUS", and each which is incorporated herein by reference in its entirety.

FIELD

This application relates to the field of computer technologies, and in particular, to a precomputed cell display method and apparatus, a precomputed cell generation method and apparatus, a computer device, a computer-readable storage medium, and a computer program product.

BACKGROUND

With the rapid development of computer technologies, virtual scenes based on computer technologies emerge, and object formation in the virtual scenes are becoming more abundant. To reduce scene rendering pressure, it is common to compute in advance according to a position of a virtual character or a camera, visibility of the position, to obtain a potential visibility set (PVS) to be stored in a scene data file. Before the PVS is computed, a plurality of precomputed cells need to be obtained through division in a virtual scene.

In at least some precomputed cell generation and display methods, a precomputed cell of a PVS is generated based on a navigation mesh in a virtual scene. When a full-view space that does not limit a reachable region of a virtual character exists in the virtual scene, all reachable regions in the virtual scene cannot be covered by the navigation mesh. Therefore, there is a disadvantage that a matching degree between the precomputed cell and the virtual scene is not high.

SUMMARY

As described herein, a precomputed cell display method and apparatus, a precomputed cell display method and apparatus, a computer device, a computer-readable storage medium, and a computer program product are provided.

According to an aspect, this application provides a precomputed cell display method, performed by a computer device. The method includes:

displaying, in response to a view space division event triggered for a virtual scene in which a virtual character is located, a limited-view space and a full-view space that are obtained through division in the virtual scene;

displaying, corresponding to a navigation mesh of a first space in the limited-view space, a plurality of precomputed cells that extend in a standing direction of the virtual character and that cover the navigation mesh, the first space being a space that is in the limited-view space and that does not overlap with the full-view space, and the navigation mesh being configured for representing a reachable region of the virtual character in the limited-view space; and displaying, corresponding to a static mesh of a second space in the full-view space, a plurality of precomputed cells that extend in the standing direction of the virtual character and that cover the static mesh, the second space being a space that is in the full-view space and that does not overlap with the limited-view space, and the static mesh being configured for representing an object contour of a static object in a space.

According to another aspect, this application further provides a precomputed cell display apparatus. The apparatus includes:

a view space display module, configured to display, in response to a view space division event triggered for a virtual scene in which a virtual character is located, a limited-view space and a full-view space that are obtained through division in the virtual scene; and a precomputed cell display module, configured to: display, corresponding to a navigation mesh of a first space in the limited-view space, a plurality of precomputed cells that extend in a standing direction of the virtual character and that cover the navigation mesh, the first space being a space that is in the limited-view space and that does not overlap with the full-view space, and the navigation mesh being configured for representing a reachable region of the virtual character in the limited-view space; and display, corresponding to a static mesh of a second space in the full-view space, a plurality of precomputed cells that extend in the standing direction of the virtual character and that cover the static mesh, the second space being a space that is in the full-view space and that does not overlap with the limited-view space, and the static mesh being configured for representing an object contour of a static object in a space.

According to another aspect, this application further provides a precomputed cell generation method. The method includes:

obtaining view space parameters of a virtual scene in which a virtual character is located, and determining a limited-view space and a full-view space in the virtual scene;

determining, according to respective positions of the limited-view space and the full-view space in the virtual scene, a first space that is within the limited-view space and that does not overlap with the full-view space and a second space that is within the full-view space and that does not overlap with the limited-view space;

generating, corresponding to a navigation mesh of the first space, a plurality of precomputed cells that extend in a standing direction of the virtual character and that cover the navigation mesh, the navigation mesh being configured for representing a reachable region of the virtual character in the limited-view space; and generating, corresponding to a static mesh of the second space, a plurality of precomputed cells that extend in the standing direction of the virtual character and that cover the static mesh, the static mesh being configured for representing an object contour of a static object in a space.

According to another aspect, this application further provides a precomputed cell generation apparatus. The apparatus includes:

a view space determining module, configured to obtain view space parameters of a virtual scene in which a virtual character is located, and determine a limited-view space and a full-view space in the virtual scene;

a non-overlapping space determining module, configured to determine, according to respective positions of the limited-view space and the full-view space in the virtual scene, a first space that is within the limited-view space and that does not overlap with the full-view space and a second space that is within the full-view space and that does not overlap with the limited-view space; and a precomputed cell generation module, configured to:
generate, corresponding to a navigation mesh of the first space, a plurality of precomputed cells that extend in a standing direction of the virtual character and that cover the navigation mesh, the navigation mesh being configured for representing a reachable region of the virtual character in the limited-view space; and generate, corresponding to a static mesh of the second space, a plurality of precomputed cells that extend in the standing direction of the virtual character and that cover the static mesh, the static mesh being configured for representing an object contour of a static object in a space.

According to another aspect, this application further provides a computer device. The computer device includes a memory and one or more processors, the memory has computer-readable instructions stored therein, and the one or more processors, when executing the computer-readable instructions, perform the operations as described herein.

According to another aspect, this application further provides a computer-readable storage medium. The computer-readable storage medium has computer-readable instructions stored therein, and the computer-readable instructions, when executed by one or more processors, perform the operations of the method as described herein.

According to another aspect, this application further provides a computer program product. The computer program product includes computer-readable instructions, and the computer-readable instructions, when executed by one or more processors, perform the operations of the method as described herein.

Details are provided in the accompany drawings and descriptions below. Other features, objectives, and advantages of this application will become apparent from the specification, the accompanying drawings, and the claims.

BRIEF DESCRIPTION OF THE DRAWINGS

The following briefly describes the accompanying drawings for describing various aspects of the disclosure. Apparently, the accompanying drawings in the following descriptions show merely examples, and persons of ordinary skill in the art may still derive other drawings from these disclosed accompanying drawings without creative efforts.

FIG. 1 is a diagram of an application environment of a precomputed cell display method and a precomputed cell generation method in accordance with one or more illustrative aspects discussed herein.

FIG. 2 is a schematic flowchart of a precomputed cell display method in accordance with one or more illustrative aspects discussed herein.

FIG. 14 is a schematic flowchart of a precomputed cell generation method in accordance with one or more illustrative aspects discussed herein.

DETAILED DESCRIPTION

Figure 3:
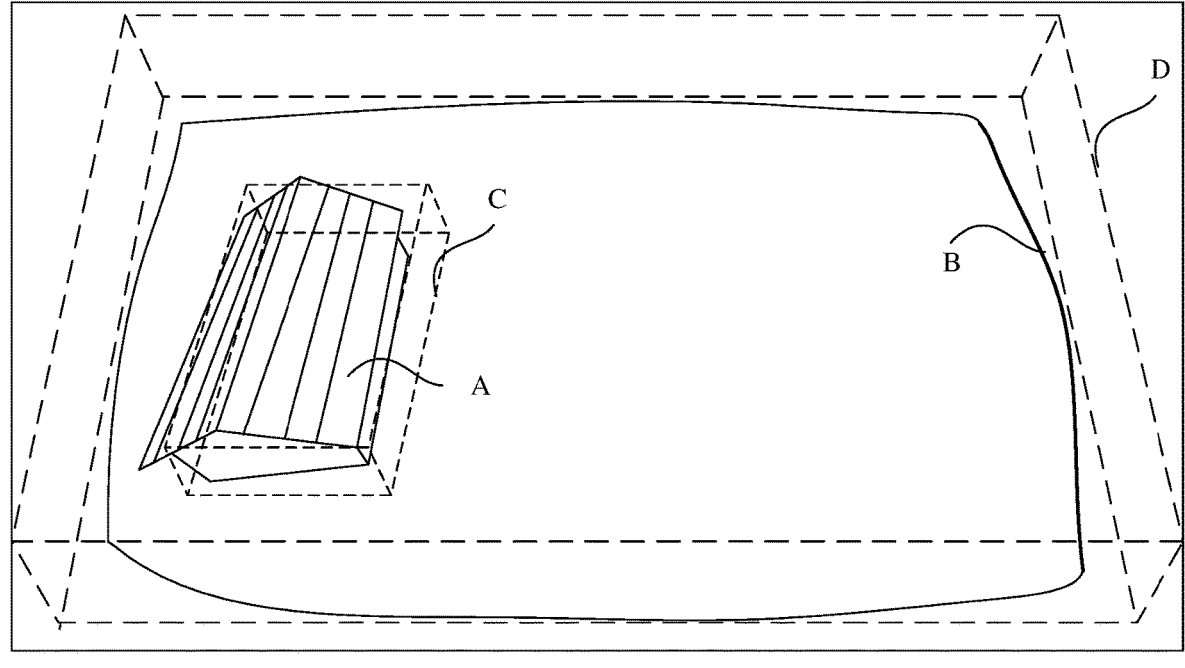
FIG. 3 is a schematic diagram of a display interface of a view space in accordance with one or more illustrative aspects discussed herein.

The technical solutions as described herein are clearly described in the following with reference to the accompanying drawings. Apparently, the aspects to be described are merely a part rather than all of the aspects of this application. All other aspects obtained by persons of ordinary skill in the art based on the aspects of this application without creative efforts shall fall within the protection scope of this application.

A precomputed cell display method and a precomputed cell generation method provided herein relate to a computer vision technology of artificial intelligence, and may be specifically applied to an application environment shown in FIG. 1. An application side 102 communicates with a server side 104 through a network. The network may be a wide region network or a local region network, or a combination thereof, and implements data transmission by using a wireless or wired link. A data storage system may store data that the server side 104 needs to process. The data storage system may be integrated on the server side 104, or may be placed on a cloud or another computer device. The server side 104 displays, in response to a view space division event triggered for a virtual scene in which a virtual character is located, a limited-view space and a full-view space that are obtained through division in the virtual scene; and generates or displays, corresponding to a navigation mesh of a first space that is within the limited-view space and that does not overlap with the full-view space and a static mesh of a second space that is within the full-view space and that does not overlap with the limited-view space, a plurality of precomputed cells extending in a standing direction of the virtual character, to cover the navigation mesh of the first space and the static mesh of the second space. The navigation mesh is configured for representing a reachable region of the virtual character in the limited-view space; and the static mesh is configured for representing an object contour of a static object in a space. After obtaining the plurality of precomputed cells, the server side 104 may perform PVS computing on each precomputed cell, and save a PVS computing result, so that when the application side 102 accesses the virtual scene, fast scene rendering can be implemented according to the PVS computing result corresponding to the position of the virtual character, to improve a display effect of a scene picture.

The server side 104 may be a terminal or a server externally connected to a display screen. The terminal may be a smartphone, a tablet computer, a notebook computer, a desktop computer, a smart speaker, a smart television, a smartwatch, or the like, but is not limited thereto. The server may be an independent physical server, or may be a server cluster or a distributed system including a plurality of physical servers, or may be a cloud server configured to provide basic cloud computing services such as a cloud service, a cloud database, cloud computing, a cloud function, cloud storage, a network service, cloud communication, a middleware service, a domain name service, a security service, a content delivery network (CDN), big data, and an artificial intelligence platform. The application side 102 and the server side 104 may be directly or indirectly connected in a wired or wireless communication manner. This is not limited in this application.

In actual application, the application side 102 may have an application program supporting the virtual scene installed therein, and then access the virtual scene through the application program. However, the application program is not necessary, and the application side 102 may alternatively access the virtual scene through a web page. The application program may be any one of a multiplayer online battle arena game (MOBA), a three-dimensional (3D) game application, a virtual reality application program, a 3D map program, or a multiplayer arena survival game. The application program may alternatively be a stand-alone application program, for example, a stand-alone 3D game program.

In a possible implementation, the precomputed cell generation and display methods may be applied to game application scenarios such as a stand-alone shooting game or a MOBA. In a virtual scene of the application scenario, both an unreachable region for a virtual character, such as a rooftop, and an outdoor lawn where a reachable region for the virtual character is not limited are included, and a house corresponding to the rooftop is set on the lawn. Specifically, the server side 104 displays, in response to a view space division event for a virtual scene in which a virtual character is located, a limited-view space and a full-view space that are obtained through division in the virtual scene. The limited-view space includes a region in which a house having an unreachable region such as a rooftop is located; and the full-view space may include a region where an outdoor lawn is located. Then, the server side 104 displays, corresponding to a navigation mesh of a first space that is within the limited-view space and that does not overlap with the full-view space and a static mesh of a second space that is within the full-view space and that does not overlap with the limited-view space, a plurality of precomputed cells extending in a standing direction of the virtual character, to cover the navigation mesh of the first space and the static mesh of the second space. The navigation mesh is configured for representing a reachable region of the virtual character in the limited-view space, and may be, for example, an indoor reachable region of the house; and the static mesh is configured for representing an object contour of a static object in a space, for example, a contour of a ground or grass. After obtaining the plurality of precomputed cells, the server side 104 may perform PVS computing on each precomputed cell, save a PVS computing result in scene data of the virtual scene, and deliver the result to the application side 102 along with the scene data. Therefore, when accessing the virtual scene, the application side 102 may remove a currently invisible static object from a rendering queue according to the PVS computing result corresponding to the position of the virtual character, thereby implementing fast scene rendering. The server side may alternatively query, according to the position of the virtual character of the application side 104, the PVS computing result corresponding to the position, and render the current virtual scene of the application side 104 based on the queried PVS computing results.

In another possible implementation, the precomputed cell generation and display methods may be applied to an application scenario of map navigation. In this application scenario, the application side 102 may have a map navigation application program installed therein, and a user can view a rendered image that is on a navigation path and that corresponds to a live view image by accessing the application program. In the application scenario, for a simulated scene that is within a map and that corresponds to each reality scene, in response to a view space division event for the simulated scene, the server side 104 displays, in the simulated scene, a limited-view space including a limited-view region such as a street and a full-view space including a view unlimited region such as an outdoor open space that are obtained through division. Then, the server side 104 displays, corresponding to a navigation mesh of a first space that is within the limited-view space and that does not overlap with the full-view space and a static mesh of a second space that is within the full-view space and that does not overlap with the limited-view space, a plurality of precomputed cells extending in a standing direction of the user, to cover the navigation mesh of the first space and the static mesh of the second space. The navigation mesh is configured for representing a reachable region of a user in the limited-view space, for example, a road between street buildings. The static mesh is configured for representing an object contour of a static object in a space, for example, a contour of a ground. After obtaining the plurality of precomputed cells, the server side 104 may perform PVS computing for each precomputed cell, and save a PVS computing result in the scene data of the simulated scene. When the user accesses the map navigation data through the application side 102, the server side 104 may query, according to view positions specified by the user, PVS computing results corresponding to the positions, determine, based on the queried PVS computing results, a visible object at a current view position, render the visible object, and feedback a rendered image at the view position to the application side 102. The view position is configured for representing a position and an orientation of the user in the scene.

For example, as shown in FIG. 2, a precomputed cell display method is provided. Descriptions are provided by using an example in which the method is applied to the server side 104 in FIG. 1. The method includes the following operations:

Operation S202: Display, in response to a view space division event triggered for a virtual scene in which a virtual character is located, a limited-view space and a full-view space that are obtained through division in the virtual scene.

The virtual scene refers to a virtual activity space provided during running of an application program or a web page in an application side, for a virtual character to perform various activities in the virtual activity space. The virtual scene may be a simulated scene of the real world, or may be a semi-simulated and semi-fictional scene, or may be an entirely fictional scene. The virtual scene may include a virtual object. The virtual object may be a scene constituent element in the virtual scene, such as a virtual lawn or a virtual building, or may be a scene participation element in the virtual scene, such as a virtual object controlled by the application side and moving in the virtual scene, or a non-player character (NPC) not controlled by the application side. That is to say, the virtual character refers to a movable object controlled by the application side in the virtual scene. The movable object may be at least one of a virtual person, a virtual animal, and a cartoon person. The application side may control, according to a received user operation, the virtual character to move in the virtual scene. For example, the activities of the virtual character in the virtual scene include: walking, running, jumping, climbing, lying prone, attacking, casting an ability, picking up a prop, and transmitting a message, but are not limited thereto, and the disclosure does not limit this.

The view space division event refers to an event configured for instructing the server side to define a view space in the virtual scene and display the defined view space. A manner of triggering the view space division event is not unique. For example, a view space division control may be displayed on a development interface, a developer may click on the view space division control, and the server side may trigger a view space division event in response to a click operation on the view space division control; or a view space division option may be displayed on the development interface, the developer may select the view space division option, and the server side may trigger a view space division event in response to a selection operation on the view space division option. Further, because the computing of the PVS needs to be performed based on completion of the illumination construction, in a possible implementation, the server side can also automatically trigger the view space division event after the illumination construction of the virtual scene is completed.

The limited-view space and the full-view space are two different types of view spaces. The limited-view space refers to a view space including a limited-view region such as a house, a street, a bridge, or the like. The limited-view region refers to a space in which a movement trajectory of the virtual character is limited and a reachable region of the virtual character may be represented by a navigation mesh. For example, a rooftop and a wall of a house may be unreachable regions of the virtual character, a building in a street may be an unreachable region of the virtual character, and a bridge pier, a cable, and the like of a bridge may be unreachable regions of the virtual character. The full-view space is a view space including a full-view region such as an outdoor open space. The full-view region refers to a space in which a movement trajectory of the virtual character is not limited. To be specific, in the full-view region, the virtual character may touch all static objects included in the region. For example, ground elements of the outdoor open space include dirt, grass, and the like.

Figure 4:
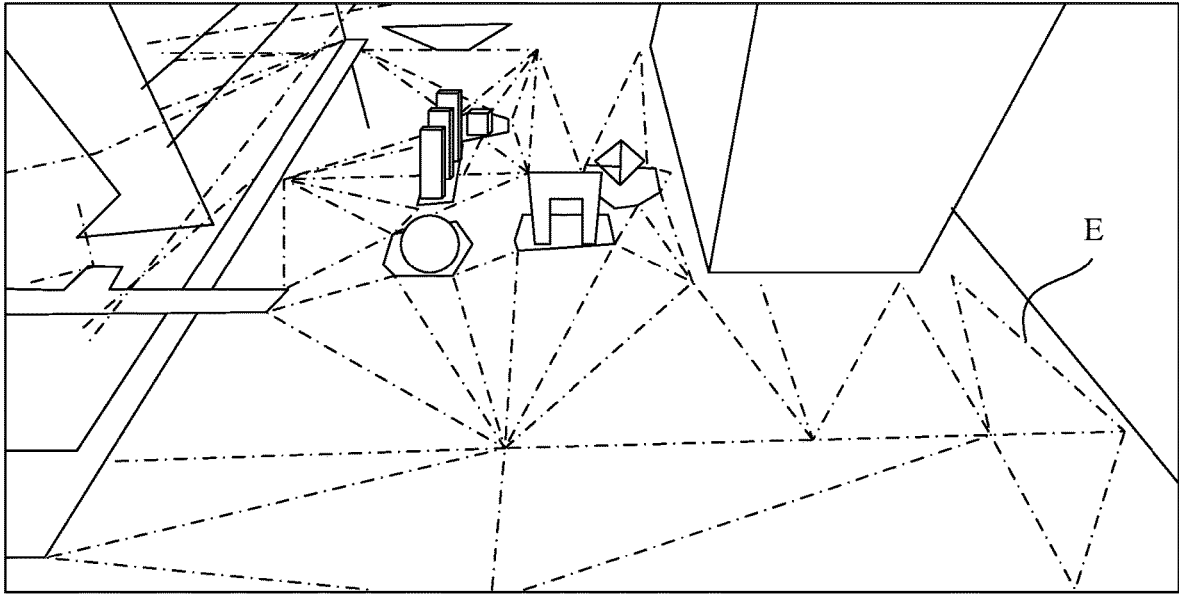
FIG. 4 is a schematic diagram of a display interface of a navigation mesh in accordance with one or more illustrative aspects discussed herein.

Further, the view space is configured for defining a range for generating a precomputed cell of the PVS in the virtual scene. The view space may be displayed as a mapped object or an unmapped line frame. A spatial shape of the view space is not unique, and may be, for example, a cuboid, a cylinder, a frustum, or an irregular shape, and spatial shapes of the limited-view space and the full-view space may be the same or different. In a specific application, the view space may be represented by a precomputed visible volume displayed as a cuboid line frame. As shown in FIG. 3, in a virtual scene including a house A and an open space B, a limited-view space C including the house A and a full-view space D including the open space B that are obtained through division may be displayed. As shown in FIG. 4, the house A in FIG. 3 includes a navigation mesh E for representing a reachable region of a virtual character.

For example, the developer may click on a view space division interface of the development interface or select a view space division option of the development interface. In response to an interface operation by the developer on the development interface, the server side triggers a view space division event for the virtual scene in which the virtual character is located, so that the limited-view space and the full-view space are obtained through division and displayed in the virtual scene. The server side may define, in response to a view space division event triggered for a virtual scene in which a virtual character is located, a limited-view space and a full-view space that are obtained through division in the virtual scene, display the defined limited-view space and full-view space at corresponding positions in the virtual scene. The specific manner in which the server side defines the limited-view space and the full-view space in the virtual scene is not unique. For example, the developer may determine a parameter of the view space, and input the parameter into the server side, and the server side defines the limited-view space and the full-view space in the virtual scene according to the inputted parameter; or the developer may draw, in the virtual scene by dragging a mouse, line frames respectively corresponding to the limited-view space and the full-view space; or the server side may determine limited-view elements and full-view elements included in the virtual scene according to reachable range attribute parameters of the scene constituent elements of the virtual scene, and then define the limited-view space including the limited-view elements and the full-view space including the full-view elements in the virtual scene.

Further, methods for displaying the limited-view space and the full-view space may be the same or different. For example, the defined limited-view space and full-view space may be respectively displayed by using different types of line frames. The different types of line frames may be different in at least one of a line color, a line thickness, or a line type; or the limited-view space and the full-view space may be differently displayed by displaying a spatial type identifier. The spatial type identifier is configured for identifying a spatial type of the limited-view space or the full-view space. The spatial type is a limited-view type or a full-view type. The spatial type identifier may include one of, or a combination of, more than one of a text, a symbol, or a number. In addition, the view space may be further configured to be hideable, so that the developer chooses to display or not display a corresponding view space. That is to say, the limited-view space and the full-view space that are obtained through division in the virtual scene may be completely displayed, partially displayed, or not displayed.

In the same virtual scene, there may be one or more limited-view spaces and full-view spaces, and there may be no overlapping space or an overlapping space between any two view spaces in the limited-view spaces and the full-view spaces. As shown in FIG. 3, there is an overlapping space between the limited-view space C and the full-view space D in the region where the house A is located. For example, the overlapping space may be represented by a precomputed override volume.

Operation S204: Display, corresponding to a navigation mesh of a first space in the limited-view space, a plurality of precomputed cells that extend in a standing direction of the virtual character and that cover the navigation mesh.

A precomputed cell is a smallest computing unit for the PVS computing and may be understood as a position of an eye of the virtual character or a camera following the virtual character. A PVS computing process corresponds to a process of determining a PVS corresponding to each Cell. The first space is a space that is within the limited-view space and that does not overlap with the full-view space; and the second space is a space that is within the full-view space and that does not overlap with the limited-view space. The navigation mesh is configured for representing a reachable region of the virtual character in the limited-view space. For the first space that is within the limited-view space and that does not overlap with the full-view space, the navigation mesh in the first space can relatively accurately represent a reachable region of the virtual character in the first space.

Based on this, the server side may display, corresponding to the navigation mesh of the first space in the limited-view space, a plurality of precomputed cells extending in the standing direction of the virtual character, to cover the navigation mesh of the first space. The standing direction of the virtual character may be a Z direction in a left-hand coordinate system. A method for displaying the precomputed cell is not unique. For example, the precomputed cell may be displayed as a mapped object or an unmapped line frame. The spatial shape of the precomputed unit cell is not unique either, and may be, for example, a cube or a cuboid. In a specific application, the precomputed cell is formed by a plurality of grids. Through grids, a space is divided into regular meshes. Each grid is a pixel unit, and corresponding attribute values are assigned to the grids to represent an entity in the space. In a possible implementation, the precomputed cell is displayed as a cuboid line frame. A precomputed cell may be further configured to be hideable, so that the developer chooses to display or not display the precomputed cell.

If there are a plurality of limited-view spaces in the same virtual scene, an overlapping space between different limited-view spaces corresponds to the foregoing first space that is within the limited-view space and that does not overlap with the full-view space, and a reachable region of the virtual character in the space may be represented by the navigation mesh.

Operation S206: Display, corresponding to a static mesh of a second space in the full-view space, a plurality of precomputed cells that extend in the standing direction of the virtual character and that cover the static mesh.

The second space is a space that is within the full-view space and that does not overlap with the limited-view space.

The static mesh is configured for representing an object contour of a static object in a space. An object contour of a static object included in the virtual scene may be represented by a static mesh of the static object. Generally, the static object displayed in the virtual scene is a map display of a static mesh of the static object. The static object refers to a virtual object that is not movable in the virtual scene, for example, a ground, a building, a tree, or the like. For the second space that is within the full-view space and that does not overlap with the limited-view space, the static mesh in the second space can relatively accurately represent a reachable region of the virtual character in the second space, for example, a static object that the virtual character may touch in the second space, a ground that the virtual character may reach in the second space, or the like.

Figure 5:
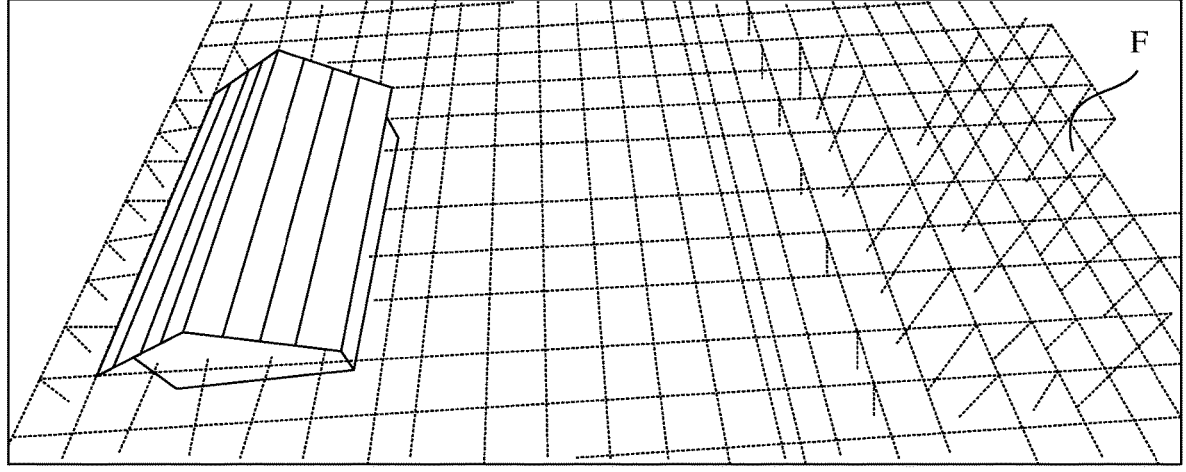
FIG. 5 is a schematic diagram of a display interface of a precomputed cell in a full-view space D in FIG. 3.
Figure 6:
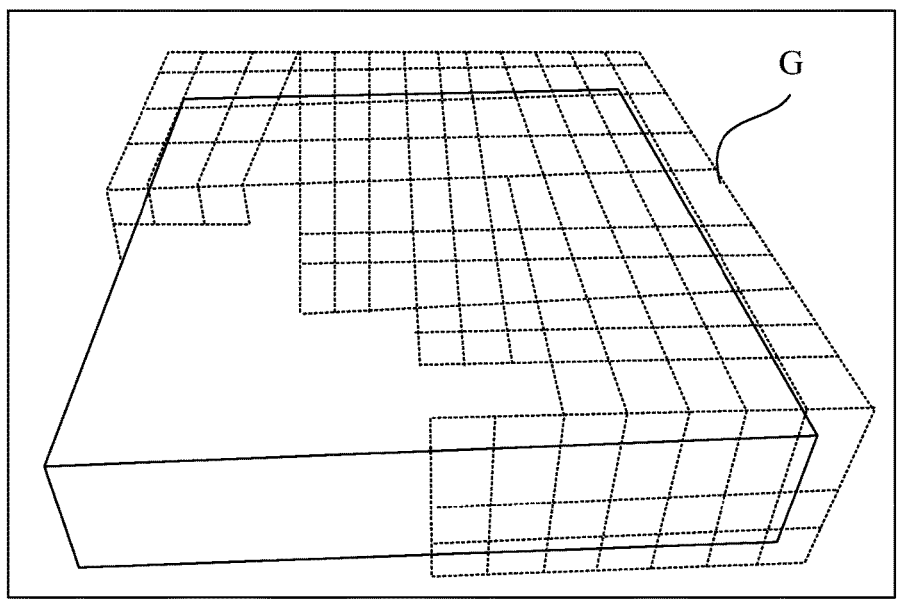
FIG. 6 is a schematic diagram of a display interface of a precomputed cell in accordance with one or more illustrative aspects discussed herein.

Based on this, the server side may display, corresponding to the static mesh of the second space in the full-view space, a plurality of precomputed cells extending in the standing direction of the virtual character, to cover the static mesh of the second space. For example, as shown in FIG. 5, for the second space that is within the full-view space D and that does not overlap with the limited-view space C in FIG. 3, a plurality of precomputed cells F extending in the standing direction of the virtual character are displayed corresponding to the static mesh of the second space, to cover the static mesh of the second space. In one aspect, On the development interface, the navigation mesh and the static mesh may be displayed or might not be displayed. For example, FIG. 4 displays a navigation mesh D of an indoor space of the house A in FIG. 3, FIG. 5 does not display a static mesh of the open space B, and FIG. 6 displays neither the navigation mesh nor the static mesh, and displays (e.g., only display) a plurality of finally generated precomputed cells G.

Further, if there are a plurality of full-view spaces in the same virtual scene, an overlapping space between different full-view spaces corresponds to the foregoing second space that is within the full-view space and that does not overlap with the limited-view space, and a reachable region of the virtual character in the space may be represented by the static mesh. In one aspect, when an overlapping space exists between the limited-view space and the full-view space, for an overlapping space between the limited-view space and the full-view space, the server side may display a plurality of precomputed cells extending in the standing direction of the virtual character corresponding to a navigation mesh and a static mesh in the overlapping space; or may display a plurality of precomputed cells extending in the standing direction of the virtual character corresponding to a navigation mesh or a static mesh in the overlapping space.

In the foregoing precomputed cell display method, displays, in response to a view space division event triggered for a virtual scene in which a virtual character is located, a limited-view space and a full-view space that are obtained through division in the virtual scene; and corresponding to a navigation mesh of a first space that is within the limited-view space and that does not overlap with the full-view space and a static mesh of a second space that is within the full-view space and that does not overlap with the limited-view space, a plurality of precomputed cells extending in a standing direction of the virtual character are generated or displayed, to cover the navigation mesh of the first space and the static mesh of the second space. Since the static mesh is configured for representing an object contour of a static object in the space, the static mesh can relatively accurately represent a reachable region of the virtual character in the full-view space. In addition, the navigation mesh is configured for representing a reachable region of the virtual character in the limited-view space. By using the foregoing method, coverage of the reachable region of the virtual character in the virtual scene by the precomputed cells can be improved, thereby improving a matching degree between the precomputed cells and the virtual scene.

For example, operation S202 includes: displaying at least two sets of view space parameters in response to a view space parameter input event; and displaying at least two view spaces in the virtual scene according to the at least two sets of view space parameters.

The view space parameters may include a position parameter and a type parameter. The position parameter is configured for representing a spatial position of the view space in the virtual scene; and the type parameter is configured for representing a spatial type of the view space. The spatial type includes a limited-view type and a full-view type. That is to say, the at least two view spaces displayed in the virtual scene include a limited-view space and a full-view space. Further, a set of view space parameters are configured for representing a spatial position and a spatial type of one view space. That is to say, the server side displays, according to parameters in the same set of view space parameters, a view space matching the set of view space parameters in the virtual scene.

For example, a parameter input window may be displayed on the development interface of the server side, and the developer may input view space parameters through the parameter input window to define parameters of a view space to be defined; or a movable cursor may be displayed on the development interface of the server side, and the developer may control the movable cursor to select a target position in the virtual scene as a spatial position of a view space to be defined; or a candidate type may be displayed on the development interface of the server side, and the developer may select a specific candidate type as a spatial type of a view space to be defined. A specific manner of selecting the target position or the candidate type may be single click, double click, hover, or the like.

In a specific aspect, the developer may input at least two sets of view space parameters through the development interface. The server side triggers and responds to a view space parameter input event in response to a parameter input operation by the developer, obtains and displays at least two sets of view space parameters, and then defines and displays, according to each set of view space parameters, a view space matching the set of view space parameters in the virtual scene. The final displayed view space includes a limited-view space and a full-view space.

In the foregoing aspect, in response to a view space parameter input event, a view space matching the input parameters is displayed in the virtual scene. The developer can flexibly perform division of the view space according to a specific virtual scene, which is conducive to improving a matching degree between the view space obtained after division and the virtual scene, and further improving a matching degree between a precomputed cell determined based on the view space and the virtual scene.

For example, the view space parameters include a position parameter, a type parameter, and a shape parameter of the view space. In a situation of this aspect, the displaying at least two view spaces in the virtual scene according to the at least two sets of view space parameters includes: displaying a view space in the virtual scene according to a position parameter, a type parameter, and a shape parameter in each set of view space parameters.

A spatial position of the view space is a position represented by the position parameter, a spatial shape of the view space is a shape represented by the shape parameter, and a spatial type of the view space is a type represented by the type parameter. The spatial position may be, for example, a position of a center of gravity of the view space, or a center position of a specific boundary surface in the view space. The shape may be, for example, a cuboid, a cylinder, a frustum, or an irregular shape that is customized by the developer and that can form a closed space. For example, for a limited-view space corresponding to a house, a spatial shape of the limited-view space may be defined as a shape matching a projection surface of the house on the ground. For example, if the projection surface is a circle, the spatial shape of the limited-view space is a cylinder, and if projection surface is a rectangle, the spatial shape of the limited-view space is a cuboid. Specifically, the server side may determine, according to the position parameter, the type parameter, and the shape parameter in each set of view space parameters, the spatial position, the spatial shape, and the spatial type of the view space matching the set of view space parameters, and define and display the view space in the virtual scene.

In the foregoing aspect, the view space parameters include a position parameter, a type parameter, and a shape parameter of the view space, so that the developer can determine, according to an actual situation of the current virtual scene, a spatial position, a spatial type, and a spatial shape of the view space in which precomputed cells need to be generated, which can further improve a matching degree between the precomputed cells determined based on the view space obtained after division and the virtual scene.

For example, the precomputed cell display method further includes: displaying, corresponding to a navigation mesh or a static mesh in the overlapping space when an overlapping space exists between the limited-view space and the full-view space, a plurality of precomputed cells extending in the standing direction of the virtual character.

Specifically, Since the navigation mesh is configured for representing a reachable region of the virtual character in the limited-view space, and the static mesh is configured for representing an object contour of a static object in a space, an overlapping space between the limited-view space and the full-view space may include both a navigation mesh and a static mesh. Based on this, when an overlapping space exists between the limited-view space and the full-view space, to avoid repeated generation of the precomputed cells in the overlapping space, the server side may display a plurality of precomputed cells extending in the standing direction of the virtual character corresponding to one of the navigation mesh and the static mesh in the overlapping space. In one aspect, the server side may generate and display, based on respective priorities of the limited-view space and the full-view space that are associated with the overlapping space, a plurality of precomputed cells extending in the standing direction of the virtual character corresponding to a target mesh of a target view space with a higher priority, to cover the target mesh in the overlapping space; or may generate and display a plurality of precomputed cells extending in the standing direction of the virtual character corresponding to either the navigation mesh or the static mesh in the overlapping space.

In the foregoing aspect, for an overlapping space between the limited-view space and the full-view space, precomputed cells are displayed corresponding to a navigation mesh or a static mesh in the overlapping space, which can avoid repeated display of the precomputed cells, and reduce waste of memory while a matching degree between the precomputed cells and the virtual scene is improved.

For example, the displaying, corresponding to a navigation mesh or a static mesh in the overlapping space when an overlapping space exists between the limited-view space and the full-view space, a plurality of precomputed cells extending in the standing direction of the virtual character includes: displaying respective priority parameters of the limited-view space and the full-view space in response to a priority parameter input event of a view space; displaying, corresponding to the navigation mesh in the overlapping space between the limited-view space and the full-view space if a priority of the limited-view space is higher than a priority of the full-view space, a plurality of precomputed cells that extend in the standing direction of the virtual character and that cover the navigation mesh of the overlapping space; and displaying, corresponding to the static mesh in the overlapping space if the priority of the full-view space is higher than the priority of the limited-view space, a plurality of precomputed cells that extend in the standing direction of the virtual character and that cover the static mesh of the overlapping space.

The priority parameter is configured for representing a priority of the view space. The priority parameter may include at least one of a spatial priority parameter and a type priority parameter. Correspondingly, the priority represented by the priority parameter may include at least one of a spatial priority represented by the spatial priority parameter and a type priority represented by the type priority parameter. The spatial priority parameter may be represented by a priority identifier of the view space. The priority identifier may be, for example, a number, and a smaller value of the number indicates a higher spatial priority. The type priority parameters may be represented by type parameters and respective type priorities of the type parameters. For example, a type priority of the limited-view type is higher than a type priority of the full-view type, or a type priority of the full-view type is higher than a type priority of the limited-view type.

For example, a priority parameter input window may be displayed on the development interface of the server side, and the developer may input priority parameters through the priority parameter input window to define a priority of a view space; or a candidate priority parameter may be displayed on the development interface of the server side, and the developer may select a specific candidate priority parameter as a priority parameter of a view space. In a possible implementation, the name of the view space includes the priority parameter. The developer may determine the priority parameter of the view space by defining the name of the view space. In a possible implementation, when an overlapping space exists between the limited-view space and the full-view space, the server side may trigger a priority parameter input event, and display a priority parameter input window on the development interface. The developer inputs priority parameters through the priority parameter input window, and then the server side displays, in response to a parameter input operation by the developer, the inputted respective priority parameters of the limited-view space and the full-view space.

In a specific aspect, the server side displays respective priority parameters of the limited-view space and the full-view space in response to a priority parameter input event of a view space. Then, for an overlapping space between the limited-view space and the full-view space, the server side displays, according to priorities represented by the priority parameters, a plurality of precomputed cells extending in a standing direction of the virtual character corresponding to a view space with a higher priority. Specifically, the server side displays, corresponding to the navigation mesh in the overlapping space between the limited-view space and the full-view space if a priority of the limited-view space is higher than a priority of the full-view space, a plurality of precomputed cells that extend in the standing direction of the virtual character and that cover the navigation mesh of the overlapping space; and displays, corresponding to the static mesh in the overlapping space between the limited-view space and the full-view space if the priority of the full-view space is higher than the priority of the limited-view space, a plurality of precomputed cells that extend in the standing direction of the virtual character and that cover the static mesh of the overlapping space. As shown in FIG. 5, because a priority of the unlimited view space D is lower than that of the limited-view space C, in an overlapping space between the limited-view space C and the unlimited view space D, a precomputed cell is not displayed based on a static mesh in the overlapping space.

When the priority parameter includes the spatial priority parameter and the type priority parameter, the server side may determine a view space with a higher priority associated with the overlapping space based on the spatial priority or the type priority, or may determine a view space with a higher priority associated with the overlapping space based on the spatial priority and the type priority. For example, the server may determine comprehensive priorities of view spaces through weighted summation according to respective weights of spatial priorities and type priorities, and then determine a view space with a higher comprehensive priority associated with the overlapping space; or the server side may first determine a selected view space with a higher priority according to one of the spatial priority and the type priority, and then determines, if a plurality of selected view spaces are determined, a view space with a higher priority from the selected view spaces according to the other of the spatial priority and the type priority.

In the foregoing aspect, based on the priority represented by the priority parameter, a view space with a higher priority associated with the overlapping space is determined, and then the precomputed cells are displayed corresponding to a target mesh of the view space. The developer can define priorities of the view spaces according to a requirement of an actual scene, which helps improve accuracy of a display result of the precomputed cells.

For example, the precomputed cell display method further includes: displaying, corresponding to a movement trajectory mesh of the virtual character, a plurality of precomputed cells that extend in the standing direction of the virtual character and that cover the movement trajectory mesh.

The movement trajectory mesh is configured for representing a movement trajectory of the virtual character moving off a ground in the virtual scene. Specifically, for an interlude animation scene in the virtual scene, the virtual character is allowed to move off the ground. Based on this, the server side may generate a movement trajectory mesh of the virtual character according to an off-ground movement trajectory allowed in the interlude animation scene, and then display, corresponding to the movement trajectory mesh, a plurality of precomputed cells extending in a standing direction of the virtual character to cover the movement trajectory mesh.

In this aspect, a plurality of precomputed cells that extend in a standing direction of the virtual character and that cover the movement trajectory mesh are displayed corresponding to the off-ground movement trajectory mesh, which can further improve coverage of a reachable region of the virtual character in the virtual scene by the precomputed cells, thereby improving a matching degree between the precomputed cells and the virtual scene, and improving a rendering speed of a subsequent virtual scene.

Figures 7, 8:
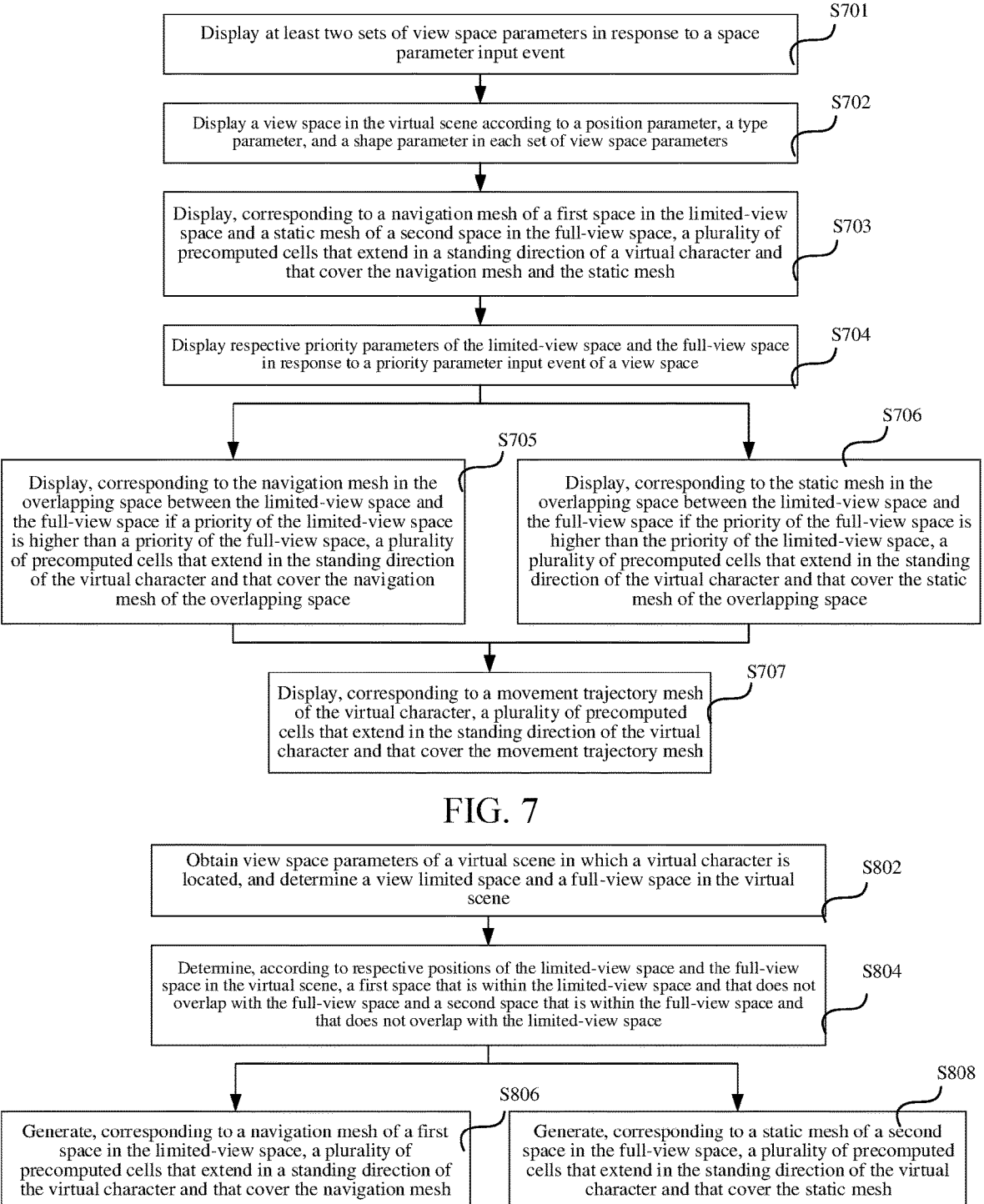
FIG. 7 is a schematic flowchart of a precomputed cell display method in accordance with one or more illustrative aspects discussed herein.
FIG. 8 is a schematic flowchart of a precomputed cell generation method in accordance with one or more illustrative aspects discussed herein.

For example, as shown in FIG. 7, a precomputed cell display method is provided, including the following operations:

Operation S701: Display at least two sets of view space parameters in response to a view space parameter input event.

The view space parameters include a position parameter, a type parameter, and a shape parameter of the view space.

Operation S702: Display a view space in the virtual scene according to a position parameter, a type parameter, and a shape parameter in each set of view space parameters.

The view space includes a limited-view space and a full-view space. A spatial position of the view space is a position represented by the position parameter, a spatial type of the view space is a type represented by the type parameter, and a spatial shape of the view space is a shape represented by the shape parameter.

Operation S703: Display, corresponding to a navigation mesh of a first space in the limited-view space and a static mesh of a second space in the full-view space, a plurality of precomputed cells that extend in a standing direction of a virtual character and that cover the navigation mesh and the static mesh.

The first space is a space that is within the limited-view space and that does not overlap with the full-view space; the second space is a space that is within the full-view space and that does not overlap with the limited-view space; the navigation mesh is configured for representing a reachable region of the virtual character in the limited-view space; and the static mesh is configured for representing an object contour of a static object in a space.

Operation S704: Display respective priority parameters of the limited-view space and the full-view space in response to a priority parameter input event of a view space.

Operation S705: Display, corresponding to the navigation mesh in the overlapping space between the limited-view space and the full-view space if a priority of the limited-view space is higher than a priority of the full-view space, a plurality of precomputed cells that extend in the standing direction of the virtual character and that cover the navigation mesh of the overlapping space.

The priorities are represented by the priority parameters.

Operation S706: Display, corresponding to the static mesh in the overlapping space between the limited-view space and the full-view space if the priority of the full-view space is higher than the priority of the limited-view space, a plurality of precomputed cells that extend in the standing direction of the virtual character and that cover the static mesh of the overlapping space.

Operation S707: Display, corresponding to a movement trajectory mesh of the virtual character, a plurality of precomputed cells that extend in the standing direction of the virtual character and that cover the movement trajectory mesh.

The movement trajectory mesh is configured for representing a movement trajectory of the virtual character moving off a ground in the virtual scene.

For example, as shown in FIG. 8, this application further provides a precomputed cell generation method. Descriptions are provided by using an example in which the method is applied to the server side 104 in FIG. 1. The method includes the following operations:

Operation S802: Obtain view space parameters of a virtual scene in which a virtual character is located, and determine a limited-view space and a full-view space in the virtual scene.

For definitions of the virtual character, the virtual scene, the view space parameter, the limited-view space, the full-view space, and the like, refer to the above. Specifically, the server side may obtain view space parameters of a virtual scene in which a virtual character is located, and determine a limited-view space and a full-view space in the virtual scene.

The specific manner in which the server side determines the limited-view space and the full-view space in the virtual scene is not unique. For example, the developer may determine a parameter of the view space, and input the parameter of the view space into the server side, and the server side determines the limited-view space and the full-view space in the virtual scene according to the inputted parameter; or the developer may draw, in the virtual scene by dragging a mouse, line frames respectively corresponding to the limited-view space and the full-view space; or the server side may determine limited-view elements and full-view elements included in the virtual scene according to reachable range attribute parameters of the scene constituent elements of the virtual scene, and then determine the limited-view space including the limited-view elements and the full-view space including the full-view elements in the virtual scene.

Operation S804: Determine, according to respective positions of the limited-view space and the full-view space in the virtual scene, a first space that is within the limited-view space and that does not overlap with the full-view space and a second space that is within the full-view space and that does not overlap with the limited-view space.

Operation S806: Generate, corresponding to a navigation mesh of a first space in the limited-view space, a plurality of precomputed cells that extend in a standing direction of the virtual character and that cover the navigation mesh.

Operation S808: Generate, corresponding to a static mesh of a second space in the full-view space, a plurality of precomputed cells that extend in the standing direction of the virtual character and that cover the static mesh.

The navigation mesh is configured for representing a reachable region of the virtual character in the limited-view space; and the static mesh is configured for representing an object contour of a static object in a space. The precomputed cell is the smallest computing unit of the PVS computing. The standing direction of the virtual character may be a Z direction in a left-hand coordinate system.

For example, the server side may determine, according to respective positions of the limited-view space and the full-view space in the virtual scene, a first space that is within the limited-view space and that does not overlap with the full-view space and a second space that is within the full-view space and that does not overlap with the limited-view space, and then generate, corresponding to the navigation mesh of the first space in the limited-view space, a plurality of precomputed cells extending in the standing direction of the virtual character, to cover the navigation mesh of the first space; and generate, corresponding to the static mesh of the second space in the full-view space, a plurality of precomputed cells extending in the standing direction of the virtual character, to cover the static mesh of the second space. When an overlapping space exists between the limited-view space and the full-view space, the server side may display a plurality of precomputed cells extending in the standing direction of the virtual character corresponding to a navigation mesh and a static mesh in the overlapping space; or may display a plurality of precomputed cells extending in the standing direction of the virtual character corresponding to a navigation mesh or a static mesh in the overlapping space.

An algorithm for generating a visibility cell is not unique. Using the second space as an example, the server side may use a surface mesh plane of the static mesh in the standing direction of the virtual character as a starting surface, and generate a plurality of precomputed cells extending in the standing direction of the virtual character; or may determine, according to position information of a surface mesh plane of the static mesh in the standing direction of the virtual character in the virtual scene and precomputed cell parameter information, a start position and a quantity of a plurality of precomputed cells configured for covering the surface mesh plane, and then generate a plurality of precomputed cells extending in the standing direction of the virtual character corresponding to the start position and the quantity.

In the foregoing precomputed cell generation method, view space parameters of a virtual scene in which a virtual character is located are obtained, and a limited-view space and a full-view space in the virtual scene are determined; a first space that is within the limited-view space and that does not overlap with the full-view space and a second space that is within the full-view space and that does not overlap with the limited-view space are determined according to respective positions of the limited-view space and the full-view space in the virtual scene; and a plurality of precomputed cells that extend in a standing direction of a virtual character and that cover a navigation mesh of the first space and a static mesh of the second space are generated corresponding to the navigation mesh of the first space in the limited-view space and the static mesh of the second space in the full-view space. Since the static mesh is configured for representing an object contour of a static object in the space, the static mesh can relatively accurately represent a reachable region of the virtual character in the full-view space. In addition, the navigation mesh is configured for representing a reachable region of the virtual character in the limited-view space. By using the foregoing method, coverage of the reachable region of the virtual character in the virtual scene by the precomputed cells can be improved, thereby improving a matching degree between the precomputed cells and the virtual scene.

For example, operation S802 includes: obtaining reachable range attribute parameters of scene component elements in the virtual scene in which the virtual character is located; generating view space parameters based on the reachable range attribute parameters and positions of the scene constituent elements in the virtual scene; and determining, based on the view space parameters, a limited-view space including a limited-view element and a full-view space including a full-view element from the virtual scene.

The reachable range attribute parameters are configured for representing spatial reachability degrees of the virtual character in the scene constituent elements, and the spatial reachability degrees include partial spatial reachability and full spatial reachability. The developer may determine a reachable range attribute parameter of scene constituent elements by calibrating a reachable region in the scene constituent elements.

The spatial reachability degree of the limited-view element is partial spatial reachability. In other words, the movement trajectory of the virtual character is limited in the region where the limited-view element is located, and the spatial reachability degree is less than 100%. For example, a rooftop and a wall of a house may be unreachable regions of the virtual character, a building in a street may be an unreachable region of the virtual character, and a bridge pier, a cable, and the like of a bridge may be unreachable regions of the virtual character. Therefore, the house, the street, and the bridge are all limited-view elements in the virtual scene. The spatial reachability degree of the full-view element is full spatial reachability. In other words, the movement trajectory of the virtual character is not limited in the region where the full-view element is located, and the spatial reachability degree is 100%. The virtual character may touch all static objects included in the region where the full-view element is located. For example, the virtual character may touch all ground elements of an outdoor open space, including dirt and grass. In this case, the outdoor open space is a full-view element in the virtual scene.

In one aspect, the server may obtain a scene image of the virtual scene, perform semantic analysis and image recognition on the scene image, determine scene constituent elements included in the virtual scene, then determine respective spatial reachability degrees of the scene constituent elements according to movement trajectory limitation types of the scene constituent elements for the virtual character, and divide the scene constituent elements into limited-view elements of the partial spatial reachability and full-view elements of the full spatial reachability. Then, the server side determines a limited-view space including a limited-view element and a full-view space including a full-view element from the virtual scene.

In one aspect, the server side may alternatively obtain scene data of the virtual scene, parse the scene data, determine reachable range attribute parameters of scene constituent elements defined in a process of constructing the virtual scene, and then determine the limited-view space and the full-view space in the virtual scene based on the respective reachable range attribute parameters of the scene constituent elements.

In actual application, shapes of the limited-view elements and the full-view elements included in the virtual scene are changed, but a shape of the view space may be unchanged. For example, in some scenes, the view space is defined as a cuboid space. Based on this, after determining the limited-view elements and the full-view elements included in the virtual scene, the server side may define the limited-view space including at least the limited-view regions and the full-view space including at least the full-view regions in the virtual scene. That is to say, a range of the limited-view space is to be greater than or equal to a region in which the limited-view element is located. For example, in FIG. 3, the limited-view space C includes a region in which the limited-view element (that is, the house A) is located. Similarly, a range of the full-view space is to be greater than or equal to that of the full-view element. For example, in FIG. 3, the full-view space D includes a region in which the full-view element (that is, the open space B) is located.

In the foregoing aspect, according to the reachable range attribute parameters of the scene constituent elements in the virtual scene, the server side can implement automatic division on the limited-view space and the full-view space, which is beneficial to improving the work efficiency of the precomputed cell generation process.

For example, the view space parameters include a type parameter and a position parameter. In a situation of this aspect, the generating view space parameters based on the reachable range attribute parameters and positions of the scene constituent elements in the virtual scene includes: determining a type parameter of a view space based on the reachable range attribute parameters; and determining a position parameter of a view space based on the positions of the scene constituent elements in the virtual scene.

The type parameter is configured for representing a spatial type of the view space; and the spatial type includes a limited-view type and a full-view type. That is to say, the view space includes a limited-view space and a full-view space. The position parameter is configured for representing a spatial position of the view space in the virtual scene. The position parameter may include at least one of parameters such as a spatial endpoint, a spatial boundary, and the like. According to an aspect, the server side may determine a type parameter of the view space based on the reachable range attribute parameter. If the spatial reachability degree represented by the reachable range attribute parameter is partial spatial reachability, the spatial type of the view space is the limited-view type; and if the spatial reachability degree represented by the reachable range attribute parameter is full spatial reachability, the spatial type of the view space is the full-view type. According to another aspect, the server side may determine a position parameter of an activity space based on the positions of the scene constituent elements in the virtual scene.

A case that the position parameter is a spatial boundary is used as an example. The server side may determine, based on an element boundary of a scene constituent element in the virtual scene, a spatial boundary of a view space including the scene constituent element. The element boundary is an interface between a scene component element of a virtual scene and another element in the virtual scene. Another element may be, for example, a limited-view element, a full-view element, or a zero view element. The zero view element may be, for example, a scene component element that is configured as a scene component element that cannot be entered by a virtual character in a virtual scene such as an abyss or a jungle. Element boundaries of different scene constituent elements may be different. For example, a region boundary of an indoor space may be a wall, a region boundary of a street may be a building on both sides of the street, a region boundary of an open lawn may be an edge of the lawn, a region boundary of an icy lake may be an edge of an ice cube, and the like. The specific manner in which the server side determines the spatial boundary according to the element boundary is not unique. Taking the limited-view space as an example, the server side may determine an element boundary of the limited-view element as a spatial boundary of the limited-view space including at least the limited-view element, that is, the boundary of the limited-view space coincides with the boundary of the limited-view element; or the server side may determine an updated boundary obtained by moving an element boundary of a limited-view element away from the limited-view element as a spatial boundary of a limited-view space including at least the limited-view element, that is, the limited-view element is within the limited-view space.

In this aspect, the type parameter of the view space is determined based on the reachable range attribute parameter, and the position parameters of the view space is determined based on the positions of the scene constituent elements in the virtual scene, so that a matching degree between the precomputed cells determined based on the view space obtained after division and the virtual scene can be improved.

As described above, for an overlapping space, the server side may generate, based on respective priorities of the limited-view space and the full-view space that are associated with the overlapping space and corresponding to a target mesh of a target view space with a higher priority, a plurality of precomputed cells that extend in the standing direction of the virtual character and that cover the target mesh in the overlapping space. Based on this, for an overlapping space, the server side further needs to perform deduplication processing on the limited-view space and the full-view space that are associated with the overlapping space, to obtain a precomputed visibility space having a view space deduplicated, making it convenient to subsequently generate precomputed cells in the precomputed visibility space.

For example, the precomputed cell generation method further includes: obtaining, when an overlapping space exists between the limited-view space and the full-view space, respective priority parameters of the limited-view space and the full-view space; determining, based on priorities respectively represented by the priority parameters, a target view space with a highest priority and a non-target view space other than the target view space from the limited-view space and the full-view space; and deleting a space in which the overlapping space is located from the non-target view space, to obtain a precomputed visibility space having a view space deduplicated, to generate precomputed cells in the precomputed visibility space.

The precomputed visibility space is a spatial range represented by the precomputed visibility volume. For specific definitions of the priority parameters, refer to the foregoing. For case of understanding, an example in which the type priority of the limited-view type is higher than the type priority of the full-view type is used as an example for description below. In one aspect, a plurality of limited-view spaces in the same virtual scene have type priority parameters that are the same and spatial priority parameters that may be the same or different. Similarly, a plurality of full-view spaces in the same virtual scene have type priority parameters that are the same and spatial priority parameters that may be the same or different. For example, a full-view space D1 has a spatial priority of level 1 and a type priority of level 2; a full-view space D2 has a spatial priority of level 2 and a type priority of level 2; a limited-view space Cl has a spatial priority of level 2 and a type priority of level 1.

In a specific application, the name of the view space may include the priority parameter. The developer may determine the priority parameter of the view space by defining the name of the view space. For example, the name of the view space may include fields such as CustomName, GenerateType, and Pri. CustomName is configured for carrying a user name of the developer. GenerateType is configured for carrying a mesh type matching a spatial type, including a navigation mesh (NavMesh) of a limited-view space and a static mesh (StaticMesh) of a full-view space. Pri is configured for carrying a spatial priority, and may be identified by a number such as 0, 1, or 2. For example, a full-view space "Demo_StaticMesh_1" has a spatial priority of level 1 and a type priority of level 2; a limited-view space "Demo_NavMesh_1" has a spatial priority of level 1 and a type priority of level 1.

For example, when an overlapping space exists between the limited-view space and the full-view space, the server side may obtain respective priority parameters of the limited-view space and the full-view space in response to a priority parameter input event of a view space; or may obtain the respective priority parameters of the limited-view space and the full-view space by reading the name of the view space. After obtaining the priority parameters, the server side then determines, based on priorities respectively represented by the priority parameters, a target view space with a highest priority and a non-target view space other than the target view space from the limited-view space and the full-view space; and deleting a space in which the overlapping space is located from the non-target view space, to obtain a precomputed visibility space having a view space deduplicated, to generate precomputed cells in the precomputed visibility space.

Figure 9:
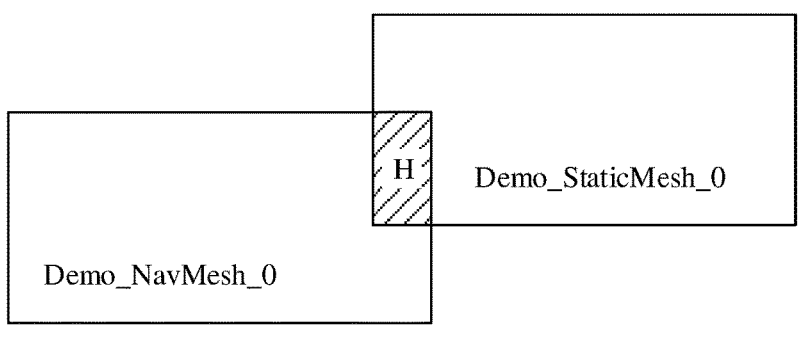
FIG. 9 is a schematic diagram of an overlapping space in accordance with one or more illustrative aspects discussed herein.

For example, the server side may delete, from a plurality of subspaces that form the non-target view space, a coinciding subspace that coincides with the overlapping space. As shown in FIG. 9, for an overlapping space H between the full-view space "Demo_StaticMesh_0" and the limited-view space "Demo_NavMesh_0", spatial priorities of the full-view space "Demo_StaticMesh_0" and the limited-view space "Demo_NavMesh_0" are the same, and a type priority of the limited-view space "Demo_NavMesh_0" is higher than a type priority of the full-view space "Demo_Static-Mesh_0". Therefore, the limited-view space "Demo_N-avMesh_0" is a target view space corresponding to the overlapping space H, and a coinciding subspace that coincides with the overlapping space H needs to be deleted from the full-view space "Demo_StaticMesh_0".

In the foregoing aspect, for an overlapping space, based on respective priorities of view spaces associated with the overlapping space, a target view space with a highest priority among the view spaces is determined; and a space in which the overlapping space is located is deleted from the non-target view space, to obtain a precomputed visibility space having a view space deduplicated, to generate precomputed cells in the precomputed visibility space, which can ensure that the precomputed cells are not repeatedly generated in the overlapping space subsequently, thereby reducing the memory occupation of the PVS computing result.

When the priority parameter includes the spatial priority parameter and the type priority parameter, the server side may determine a target view space with a highest priority based on the spatial priority and the type priority represented by the priority parameter. For example, the server may determine respective comprehensive priorities of view spaces through weighted summation according to respective weights of spatial priorities and type priorities, and then determine a target view space with a highest comprehensive priority; or the server side may first determine a selected view space with a highest spatial priority or type priority according to one of the spatial priority and the type priority, and then determines, if a plurality of selected view spaces are determined, a target view space from the selected view spaces according to the other of the spatial priority and the type priority.

For example, the priority parameter includes a spatial priority parameter and a type priority parameter; and the priority includes a spatial priority represented by the spatial priority parameter and a type priority represented by the type priority parameter. In a situation of this aspect, the determining, based on priorities respectively represented by the priority parameters, a target view space with a highest priority from the limited-view space and the full-view space includes: determining a selected view space with a highest spatial priority in the limited-view space and the full-view space; determining the selected view space as a target view space if one selected view space exists; and determining, if a plurality of selected view spaces exist, a target view space with a highest type priority from the selected view spaces.

As described above, in the same virtual scene, there may be one or more limited-view spaces and full-view spaces, and there may be an overlapping space between any two view spaces in the limited-view spaces and the full-view spaces. That is to say, an overlapping space may be associated with at least two limited-view spaces simultaneously, or may be associated with at least two full-view spaces simultaneously. To be specific, in this application, at least two view spaces are associated with the same overlapping space, and the view spaces associated with the overlapping space include at least one limited-view space and at least one full-view space.

Specifically, the server may first determine spatial priorities, determine a selected view space with a highest spatial priority in the limited-view space and the full-view space, and determine the selected view space as a target view space if one selected view space exists. For example, for an overlapping space among the full-view space "Demo_StaticMesh_2", the limited-view space "Demo_NavMesh_2", and the full-view space "Demo_StaticMesh_1", the full-view space "Demo_StaticMesh_1" with the highest spatial priority is determined as the target view space. Further, because the spatial priorities of the view spaces may be the same, there are two or more selected view spaces with the highest spatial priority. In this case, the server then determines type priorities, and determines a target view space with a highest type priority from the selected view spaces. For example, for an overlapping space among the full-view space "Demo_StaticMesh_1", the limited-view space "Demo_NavMesh_1", and the full-view space "Demo_StaticMesh_2", the selected view spaces with the highest spatial priority include the full-view space "Demo_StaticMesh_1" and the limited-view space "Demo_NavMesh_1", and the limited-view space "Demo_NavMesh_1" with the higher type priority is determined as the target view space.

If a plurality of view spaces with the highest type priority exist in the selected view spaces, for example, when the type priority of the limited-view space is higher than the type priority of the full-view space, the selected view spaces include a plurality of limited-view spaces. The spatial types of the view spaces are the same, and meshes corresponding to the spatial types and included in the overlapping space are exactly the same. Therefore, the precomputed cells generated corresponding to any one of the view spaces in the overlapping space are also the same. Based on this, the server side can determine any one of the view spaces as the target view space.

In this aspect, the target view space is determined from a plurality of dimensions such as a spatial priority and a type priority, which can improve accuracy of a determination result of the target view space, thereby improving accuracy of precomputed cells of an overlapping space that are generated based on meshes of the target view space.

As described above, for the non-target view space of the view spaces associated with the same overlapping space, a space in which the overlapping space is located may be deleted from the non-target view space, to avoid a conflict. For example, the deleting a space in which the overlapping space is located from the non-target view space includes: determining, based on respective positions of the overlapping space and the non-target view space in the virtual scene, an extension surface of a boundary surface of the overlapping space in the non-target view space; splitting the non-target view space based on the extension surface, to obtain a plurality of non-target subspaces corresponding to the non-target view space; and deleting a coinciding subspace that coincides with the overlapping space from the non-target subspaces.

In one aspect, the server side may determine, based on respective positions of the overlapping space and the non-target view space in the virtual scene, an extension surface of a boundary surface of the overlapping space in the non-target view space. If the determined extension surface includes extension surfaces of all boundary surfaces of the overlapping space, the server side may split the non-target view space based on the extension surface, to obtain a plurality of non-target subspaces corresponding to the non-target view space, and delete a coinciding subspace that coincides with the overlapping space from the non-target subspaces. If the determined extension surface includes extension surfaces of some boundary surfaces of the overlapping space, the server side may split the non-target view space based on the determined extension surface and another part of the boundary surfaces that are not coplanar with the extension surface, to obtain a plurality of non-target subspaces corresponding to the non-target view space, and delete a coinciding subspace that coincides with the overlapping space from the non-target subspaces.

In this aspect, the algorithm of splitting and then deduplicating the non-target view space based on an extension surface of the boundary surface of the overlapping space in the non-target view space is simple, which is conducive to improving the generation efficiency of the precomputed cells.

In a specific application, the overlapping space is a cuboid space. In a situation of this aspect, the splitting the non-target view space based on the extension surface, to obtain a plurality of non-target subspaces corresponding to the non-target view space includes: splitting the non-target view space based on a first extension surface of the overlapping space in the non-target view space, to obtain a first overlapping subspace that overlaps with the overlapping space and a first independent subspace that does not overlap with the overlapping space; splitting the first overlapping subspace based on a second extension surface of the overlapping space in the first overlapping subspace, to obtain a second overlapping subspace that overlaps with the overlapping space and a second independent subspace that does not overlap with the overlapping space; splitting the second overlapping subspace based on a third boundary surface that is of the overlapping space and that is perpendicular to a direction of a third coordinate axis, to obtain a coinciding subspace that coincides with the overlapping space and a third independent subspace that does not overlap with the overlapping space; and determining the first independent subspace, the second independent subspace, the coinciding subspace, and the third independent subspace as a plurality of non-target subspaces corresponding to the non-target view space.

The first extension surface is an extension surface of a first boundary surface that is of the overlapping space and that is perpendicular to a direction of a first coordinate axis; the second extension surface is an extension surface of a second boundary surface that is of the overlapping space and that is perpendicular to a direction of a second coordinate axis in the first overlapping subspace. The first coordinate axis, the second coordinate axis, and the third coordinate axis jointly form a spatial coordinate system in the virtual scene.

Specifically, the server side may split the non-target view space based on a first extension surface of the overlapping space in the non-target view space, to obtain a first overlapping subspace that overlaps with the overlapping space and a first independent subspace that does not overlap with the overlapping space. If there is a set of coplanar boundary surfaces in the boundary surfaces that are of the overlapping space and the non-target view space and that are perpendicular to the direction of the first coordinate axis, that is, the overlapping space is located at an edge that is of the non-target view space and that is perpendicular to the direction of the first coordinate axis, there is one first extension surface, and there is also one first independent subspace. If the overlapping space is located inside the non-target view space, a quantity of first extension surfaces is two, and the non-target view space may be split into one overlapping subspace and two independent subspaces based on the two first extension surfaces.

Then, the server side splits the first overlapping subspace based on a second extension surface of the overlapping space in the first overlapping subspace, to obtain a second overlapping subspace that overlaps with the overlapping space and a second independent subspace that does not overlap with the overlapping space. Similarly, if there is a set of coplanar boundary surfaces in the boundary surfaces that are of the overlapping space and the non-target view space and that are perpendicular to the direction of the second coordinate axis, that is, the overlapping space is located at an edge that is of the non-target view space and that is perpendicular to the direction of the second coordinate axis, there is one second extension surface, and there is also one second independent subspace. If the overlapping space is located inside the non-target view space, a quantity of second extension surfaces is two, and the first overlapping subspace may be split into one overlapping subspace and two independent subspaces based on the two second extension surfaces.

Then, the server side splits the second overlapping subspace based on a third boundary surface that is of the overlapping space and that is perpendicular to a direction of a third coordinate axis, to obtain a coinciding subspace that coincides with the overlapping space and a third independent subspace that does not overlap with the overlapping space. Finally, the server side determines the first independent subspace, the second independent subspace, the coinciding subspace, and the third independent subspace as a plurality of non-target subspaces corresponding to the non-target view space.

Figure 10:
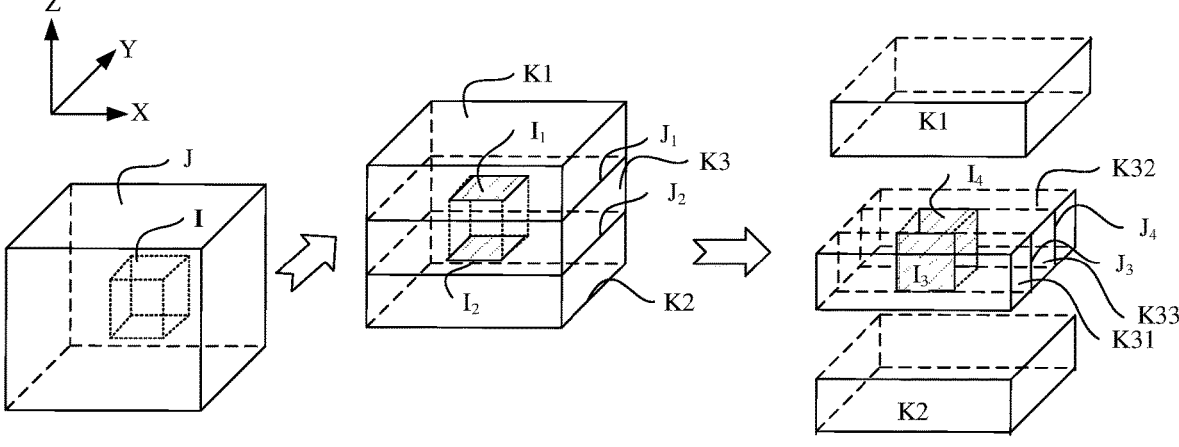
FIG. 10 is a schematic diagram of a process of splitting a non-target view space in accordance with one or more illustrative aspects discussed herein.
Figure 11:
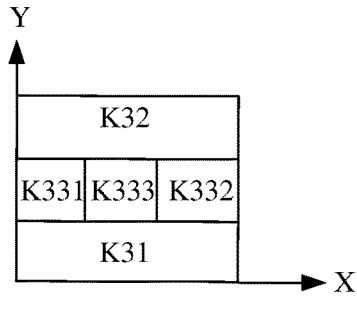
FIG. 11 is a schematic diagram of a projection of a split overlapping subspace K3 in FIG. 10 on an XY plane.

The following uses, with reference to FIG. 10 and FIG. 11, an example in which the overlapping space is inside the non-target view space, the direction of the first coordinate axis is the Z-axis direction, the direction of the second coordinate axis is the Y-axis direction, and the direction of the third coordinate axis is the X-axis direction, to describe the splitting process of the non-target view space. As shown in FIG. 10, an overlapping space I is located inside a non-target view space J. The server side may split, based on respective extension surfaces $J_1$ and $J_2$ in the non-target view space J that are of boundary planes $I_1$ and $I_2$ in the overlapping space I that are perpendicular to the Z direction, the non-target view space J into independent subspaces K1 and K2 that do not overlap with the overlapping space I and an overlapping subspace K3 that overlaps with the overlapping space I. Then, the server side splits, based on respective extension surfaces $J_3$ and $J_4$ in the overlapping subspace K3 that are of boundary planes $I_3$ and $I_4$ in the overlapping space I that are perpendicular to the Y direction, the overlapping subspace K3 into independent subspaces K31 and K32 that do not overlap with the overlapping space I and an overlapping subspace K33 that overlaps with the overlapping space I. Finally, the server side splits the overlapping subspace K33 based on two boundary surfaces of the overlapping space I that are perpendicular to the X direction, to obtain a coinciding subspace K333 that coincides with the overlapping space I, and independent subspaces K331 and K332 that do not overlap with the overlapping space. As shown in FIG. 11, a projection of the overlapping subspace K33 on the XY plane includes five regions, respectively corresponding to five subspaces. That is to say, after splitting, the non-target view space J is divided into seven non-target subspaces, including six independent subspaces and one coinciding subspace. The coinciding subspace is deleted.

In this aspect, for a cuboid overlapping space, spatial splitting is sequentially performed based on extension surfaces in all directions, which can ensure that a quantity of independent subspaces remaining after splitting is relatively small, making it convenient to subsequently generate precomputed cells.

For example, a process of generating the precomputed cells includes: determining a mesh plane of a target mesh in the virtual scene based on the standing direction of the virtual character in the virtual scene; determining, according to position information of the mesh plane in the virtual scene and precomputed cell parameters, cell position parameters of a plurality of precomputed cells configured for covering the target mesh; and generating, based on the cell position parameters, a plurality of precomputed cells that extend in the standing direction and that cover the target mesh.

The target mesh includes the navigation mesh of the first space in the limited-view space and the static mesh of the second space in the full-view space. Adjacent precomputed cells do not overlap with each other. The cell position parameters may include a cell start position and quantities of precomputed cells in directions, or the cell position parameters may be respective position information of the precomputed cells in the virtual scene. The start position refers to a placement position of the first precomputed cell, and the quantities include quantities in three orthogonal directions in a spatial coordinate system. Determining the start position and the quantity of the precomputed cells is equivalent to determining an array arrangement manner of the plurality of precomputed cells to be generated in the virtual scene.

For example, the server side may determine a mesh plane of a target mesh in the standing direction in the virtual scene based on the standing direction of the virtual character in the virtual scene. These mesh planes are surface mesh planes of the target mesh, that is, meshes configured for representing planes that the virtual character can reach and contact, for example, a ground mesh plane, a lake mesh plane, a wall mesh plane that can be climbed, or the like. Then, the server side determines, according to position information of the mesh plane in the virtual scene and precomputed cell parameters, cell position parameters of a plurality of precomputed cells configured for covering the target mesh. Finally, the server side generates, based on the cell position parameters and according to the principle that adjacent precomputed cells do not overlap with each other, a plurality of precomputed cells that extend in the standing direction and that cover the target mesh.

Corresponding to the same target mesh, there are usually a plurality of mesh planes, such as a plurality of triangular planes in the navigation mesh E of the ground in FIG. 4. the server side may determine, for position information of each mesh plane of the target mesh in the virtual scene and a precomputed cell parameter, a precomputed cell configured for covering each mesh plane, to obtain a plurality of precomputed cells covering the target mesh. The plurality of precomputed cells covering the target mesh are a plurality of precomputed cells covering all mesh planes of the target mesh.

In the foregoing aspect, the mesh planes of the target mesh are first determined, then the cell position parameters of the plurality of precomputed cells configured for covering the target mesh are determined based on the position information of the mesh planes and the precomputed cell parameters, and then the plurality of precomputed cells that cover the target mesh and that do not overlap with each other are generated. This can avoid repeated computing of the PVS data, to help improve data processing efficiency.

For example, the precomputed cell parameters include grid formation of the precomputed cells and respective grid positions of grids configured for forming the precomputed cells in the virtual scene. In a situation of this aspect, the determining, according to position information of the mesh plane in the virtual scene and precomputed cell parameters, a start position and a quantity of a plurality of precomputed cells configured for covering the target mesh includes: determining, based on the position information of the mesh plane in the virtual scene, a planar projection region of the mesh plane on any coordinate plane of the virtual scene and a height interval of the mesh plane perpendicular to the coordinate plane; determining, according to respective grid positions of the grids in the virtual scene, target grids that are of the grids and that match the planar projection region and the height interval; and determining, according to positions of the target grids in the virtual scene and the grid formation of the precomputed cells, a start position and a quantity of the plurality of precomputed cells configured for covering the target mesh.

Figure 12:
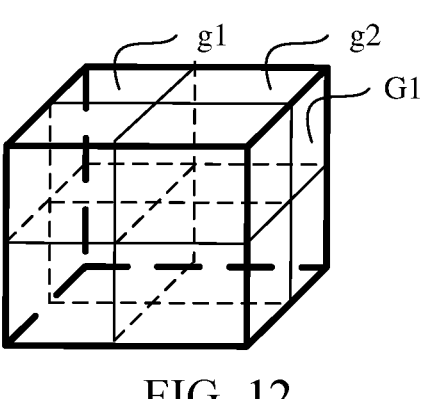
FIG. 12 is a schematic diagram of grid formation of a precomputed cell in accordance with one or more illustrative aspects discussed herein.

The grid formation of the precomputed cells includes a quantity of grids and a stacking manner in each direction of the precomputed cells. For example, as shown in FIG. 12, a precomputed cell G1 may include 8 grids, g1 to g8 (e.g., only g1 and g2 are shown in FIG. 10), that are regularly stacked in a 2*2*2 manner. In one aspect, a 3D virtual space in which the virtual scene is located may be represented as a space formed by a plurality of grids, and three sides of a same vertex in a grid are respectively parallel to directions of three coordinate axes of the 3D virtual space. That is to say, each of the grids configured for forming the precomputed cell corresponds to a unique grid position in the virtual scene. Each precomputed cell includes at least one of the target grids.

Specifically, the server side may determine, based on the position information of the mesh plane in the virtual scene, a planar projection region of the mesh plane on any coordinate plane of the virtual scene and a height interval of the mesh plane perpendicular to the coordinate plane in the virtual scene. The height interval may be described by using a height map. The height map is an illustration for describing a height interval occupied by a mesh surface in the virtual scene. The height map may be expressed discretely by using a grid. Then, the server side determine, according to respective grid positions of the grids in the virtual scene, target grids that are of the grids and that match the planar projection region and the height interval. That is to say, the target grid matches a planar projection region of the mesh plane on a coordinate plane, and the target grid matches the mesh plane on a height interval perpendicular to the coordinate plane. The target grid may be a grid that intersects or is adjacent to the mesh plane, or may be a grid whose distance from the mesh plane is less than the height interval of the mesh plane perpendicular to the coordinate plane. Finally, the server side may determine, according to positions of the target grids in the virtual scene and the grid formation of the precomputed cells, a start position and a quantity of the plurality of precomputed cells configured for covering the target mesh. Each determined precomputed cell includes at least one of the target grids.

In the foregoing aspect, a target grid is determined based on a planar projection region of the mesh plane on any coordinate plane and a height interval perpendicular to the coordinate plane, and then a plurality of precomputed cells including at least one target grid and configured for covering a target mesh on which the mesh plane is located are determined, which can ensure coverage of the target mesh by the precomputed cells.

In a specific application, the determining, according to respective grid positions of the grids in the virtual scene, target grids that are of the grids and that match the planar projection region and the height interval includes: determining respective grid projection regions of the grids on the coordinate plane according to the respective grid positions of the grids in the virtual scene; determining, from the grid projection regions, a selected grid projection region whose overlapping area with the planar projection region satisfies an area condition; and determining a selected grid located within the height interval in the virtual scene as a target grid.

A projection region of the selected grid on the coordinate plane is the selected grid projection region. That the overlapping area satisfies the area condition may mean that the overlapping area is greater than a set area, or the overlapping area is greater than or equal to a set area, or may mean that a ratio of the overlapping area to a grid projection area is greater than a set ratio, or greater than or equal to a set ratio. The area condition may be determined by the developer according to a requirement of an actual scene.

Figure 13:
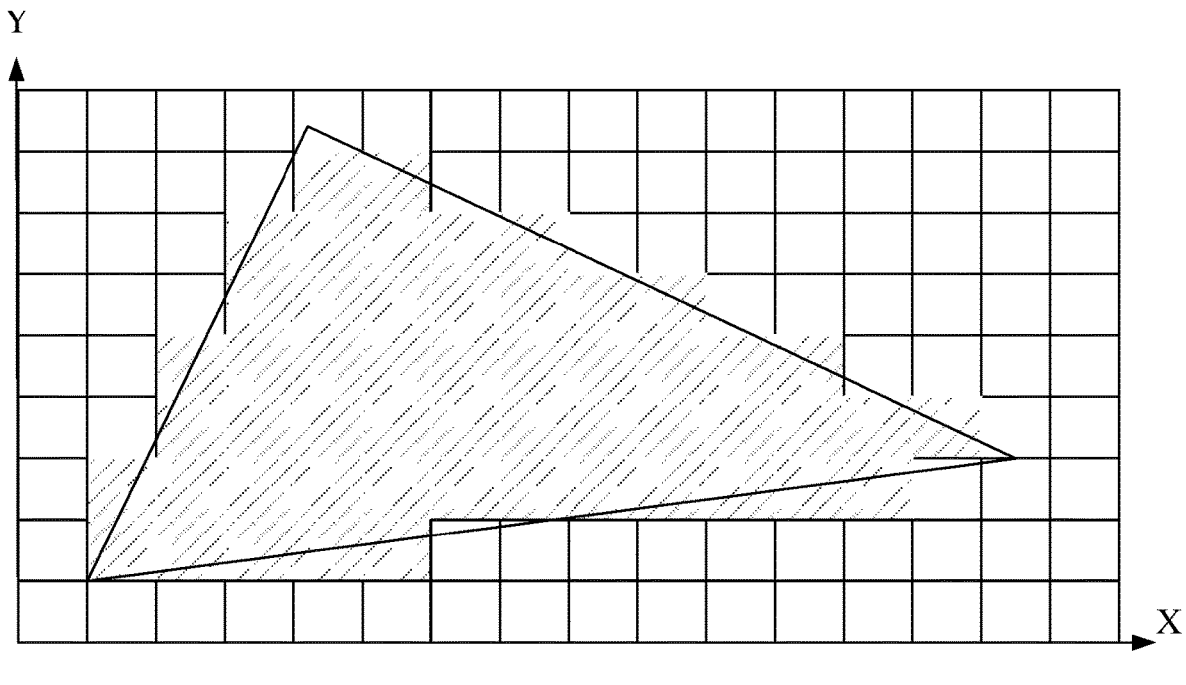
FIG. 13 is a schematic diagram of a planar projection region and a grid projection region on an XY plane in accordance with one or more illustrative aspects discussed herein.

Specifically, the server side may determine respective grid projection regions of the grids on the coordinate plane according to the respective grid positions of the grids in the virtual scene. Then, the server side superimposes and displays the grid projection region and the planar projection region of the mesh plane, and can determine an overlapping area between the grid projection region of each grid and the planar projection region, and then determine, from the grid projection regions, a selected grid projection region whose overlapping area with the planar projection region satisfies an area condition. Finally, the server side determine a selected grid located within the height interval in the virtual scene as a target grid. For example, as shown in FIG. 13, for a specific mesh plane of a target mesh, the mesh plane may be projected onto an XY plane, to determine a selected grid projection region of the mesh plane on the XY plane, for example, a grid projection region being a shaded portion in FIG. 13. Then, according to a height interval of the mesh plane in a Z direction, a target grid is determined from selected grids corresponding to the selected grid projection region.

In this aspect, the algorithm of determining the selected grid projection region according to an overlapping area between the grid projection region and the planar projection region in the same coordinate plane, and then determining the target grid from the selected grids whose projection region is the selected grid projection region is simple, which is conducive to improving efficiency.

For example, the precomputed cell parameters include grid composition of the precomputed cells and respective grid positions of grids configured for forming the precomputed cells in the virtual scene; and the cell position parameters include respective cell position information of the precomputed cells in the virtual scene. In a situation of this aspect, the determining, according to position information of the mesh plane in the virtual scene and precomputed cell parameters, cell position parameters of a plurality of precomputed cells configured for covering the target mesh includes: determining, based on the position information of the mesh plane in the virtual scene, respective planar projection regions of the mesh plane on any two coordinate planes of the virtual scene; determining, for each of the planar projection regions and according to the respective grid positions of the grids in the virtual scene, respective grid projection regions of the grids on a coordinate plane in which the planar projection region is located; determining, from the grid projection regions, target grid projection regions associated with the planar projection regions, and grid position information of a target grid jointly represented by the target grid projection regions; and determining, according to the grid position information and the grid formation of the precomputed cells, cell position information of each precomputed cell in the virtual scene in the plurality of precomputed cells configured for covering the target mesh.

Each precomputed cell includes at least one of the target grids. A grid projection region of the target grid in the coordinate plane intersects or is adjacent to a planar projection region of the mesh plane in the coordinate plane, or is within the planar projection region. In a specific application, an overlapping area between a grid projection region of the target grid in a coordinate plane and a planar projection region of a mesh plane in the coordinate plane satisfies an area condition. For a specific definition of the area condition, refer to the foregoing.

Specifically, the server side may determine, based on the position information of the mesh plane in the virtual scene, respective planar projection regions of the mesh plane on any two coordinate planes of the virtual scene. Then, the server side determines, for each of the planar projection regions and according to the respective grid positions of the grids in the virtual scene, respective grid projection regions of the grids on a coordinate plane in which the planar projection region is located. Then, the server side determines a target grid projection region associated with the planar projection region from the grid projection regions. The server side may determine, according to the respective target grid projection regions in the two coordinate planes, grid position information of a target grid jointly represented by the respective target grid projection regions of the coordinate planes. An example in which the two coordinate planes are an XY plane and an XZ plane is used. As shown in FIG. 13, according to the mesh plane and the respective projections of the grids on the XY plane, a target grid projection region in the plane may be determined, as indicated by the shaded portion. The target grid projection region may represent position information of the target grid in the X-axis direction and the Y-axis direction. Similarly, the target grid projection region on the XZ plane may represent position information of the target grid in the X-axis direction and the Z-axis direction. Through the position information of the target grid in the X-axis direction, an association between target grid projection regions on the two coordinate planes can be established, and projection regions of the same target grid on the coordinate planes can be determined. In this way, the grid position information of the target grid in the virtual scene can be determined. Finally, the server side may determine, according to the respective grid position information of the target grids in the virtual scene and the grid composition of the precomputed cells, cell position information of each precomputed cell in the virtual scene in the plurality of precomputed cells configured for covering the target mesh. The cell position information is configured for representing respective positions of the precomputed cell in the X-axis, Y-axis, and Z-axis directions.

In this aspect, cell position information of each precomputed cell in a plurality of precomputed cells in the virtual scene is determined according to the mesh plane and respective projection regions of each grid in any two coordinate planes, and corresponding to each position on the mesh plane, a unique precomputed cell covering the position and extending in the standing direction of the virtual character can be determined, which can avoid generation of excess precomputed cells while ensuring that the precomputed cell covers the mesh plane, to help reduce memory occupation and improve efficiency.

For example, as shown in FIG. 14, a precomputed cell generation method is provided, including the following operations:

Operation S1401: Obtain reachable range attribute parameters of scene component elements in the virtual scene in which the virtual character is located.

The reachable range attribute parameters are configured for representing spatial reachability degrees of the virtual character in the scene constituent elements, and the spatial reachability degrees include partial spatial reachability and full spatial reachability.

Operation S1402: Determine a type parameter of a view space based on the reachable range attribute parameters; and determine a position parameter of a view space based on the positions of the scene constituent elements in the virtual scene.

The type parameter is configured for representing a spatial type of the view space; and the spatial type includes a limited-view type and a full-view type; and the position parameter is configured for representing a spatial position of the view space in the virtual scene.

Operation S1403: Determine, based on the position parameter and the type parameter, a limited-view space including a limited-view element and a full-view space including a full-view element from the virtual scene.

A spatial reachability degree of the limited-view element is partial spatial reachability, and a spatial reachability degree of the full-view element is full spatial reachability.

Operation S1404: Determine whether an overlapping space exists between the limited-view space and the full-view space according to respective positions of the limited-view space and the full-view space in the virtual scene.

Operation S1405: Generate, corresponding to a navigation mesh of the limited-view space and a static mesh of the full-view space when no overlapping space exists between the limited-view space and the full-view space, a plurality of precomputed cells that extend in a standing direction of a virtual character and that cover the navigation mesh and the static mesh.

The navigation mesh is configured for representing a reachable region of the virtual character in the limited-view space; and the static mesh is configured for representing an object contour of a static object in a space.

Operation S1406: Obtain, when an overlapping space exists between the limited-view space and the full-view space, respective priority parameters of the limited-view space and the full-view space.

The priority parameter includes a spatial priority parameter and a type priority parameter; and the priority includes a spatial priority represented by the spatial priority parameter and a type priority represented by the type priority parameter.

Operation S1407: Determine a selected view space with a highest spatial priority in the limited-view space and the full-view space.

Operation S1408: Determine the selected view space as a target view space if one selected view space exists; and determine, if a plurality of selected view spaces exist, a target view space with a highest type priority from the selected view spaces.

Operation S1409: Determine, based on respective positions of the overlapping space and the non-target view space in the virtual scene, an extension surface of a boundary surface of the overlapping space in the non-target view space.

Operation S1410: Split the non-target view space based on the extension surface, to obtain a plurality of non-target subspaces corresponding to the non-target view space.

Operation S1411: Delete a coinciding subspace that coincides with the overlapping space from the non-target subspaces, to obtain an updated limited-view space and an updated full-view space after deduplication.

Operation S1412: Generate, corresponding to a navigation mesh of the updated limited-view space and a static mesh of the updated full-view space, a plurality of precomputed cells that extend in a standing direction of a virtual character and that cover the navigation mesh and the static mesh.

Figure 15:
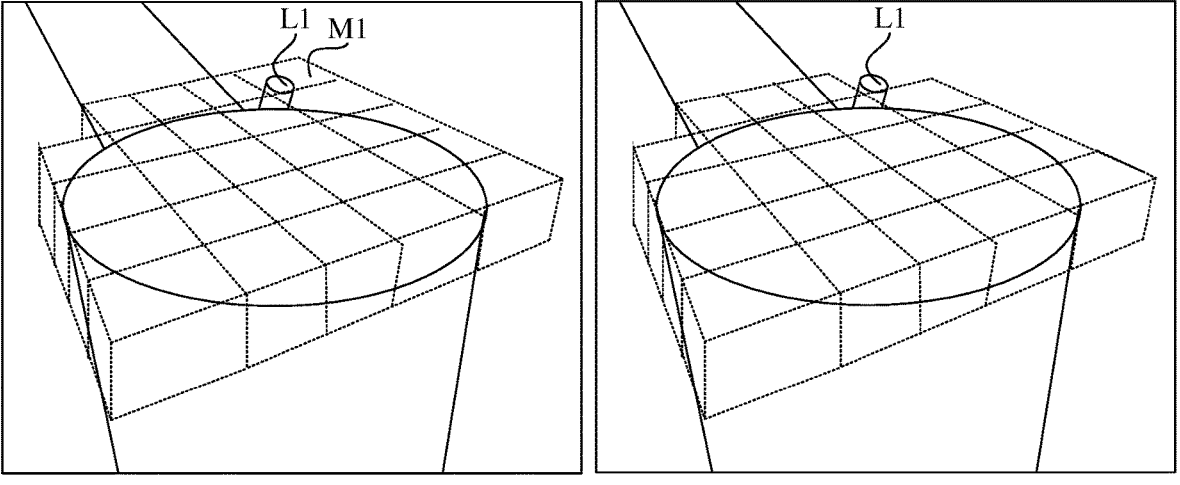
FIG. 15 is a schematic diagram of a generation result of a precomputed cell in accordance with one or more illustrative aspects discussed herein.
Figure 16:
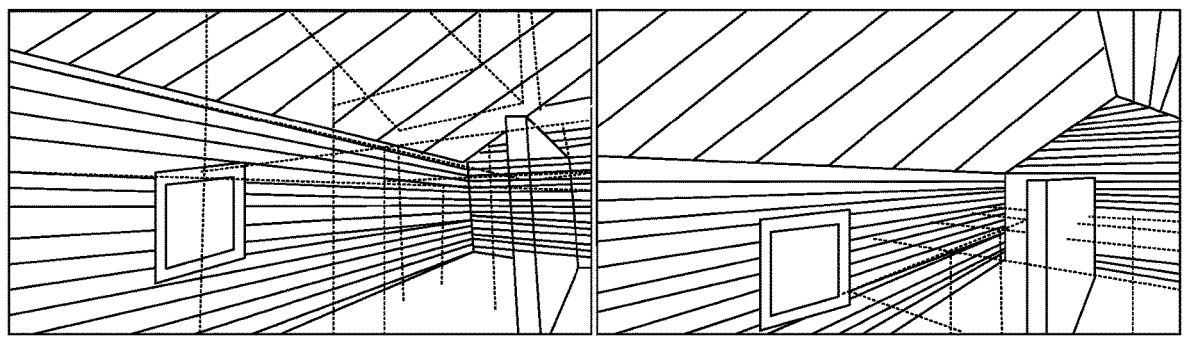
FIG. 16 is a schematic diagram of a generation result of a precomputed cell in accordance with one or more illustrative aspects discussed herein.

In a virtual scene, there are usually both a limited-view element and a full-view element. If a plurality of precomputed cells for a PVS are generated based on the static mesh within the defined range of the precomputed visibility volume, precomputed cells are also generated in an unreachable region of a virtual character in the limited-view element, resulting in waste of the memory and the packet body. For example, in a left image of FIG. 15, an adornment L1 on the periphery of a circle table is an unreachable region, and a generated precomputed cell MI is a useless cell. For another example, in a left image of FIG. 16, unnecessary cells are also generated on an adornment on a wall in a scene. If a plurality of precomputed cells for a PVS are generated based on a navigation mesh within a defined range of a precomputed visibility volume, although a quantity of generated precomputed cells can be controlled, incomplete coverage of the precomputed cells may occur for a scene of an open world. Based on this, in this application, precomputed cells are generated using a hybrid policy. Corresponding to the house in FIG. 3 in which an activity space of a virtual character is limited, a precomputed cell is generated based on the navigation mesh. For example, in a right image of FIG. 15, the top of a circle table (e.g., only the top of the circle table) is covered with precomputed cells, to avoid generating invalid cells in an unreachable region for a virtual character, such as a decoration L1 on the periphery of the circle table. For another example, in a right image of FIG. 16, the top of the ground (e.g., the top of the ground) is covered with precomputed cells, to avoid generating invalid cells in an unreachable region for a virtual character, such as a rooftop. However, for an open space outside the house, because a reachable region of the virtual character is not limited, precomputed cells are generated according to the static mesh of the terrain.

By using the solution of this application, the coverage of the character reachable region in the virtual scene by precomputed cells can be ensured, and the generation of invalid cells can be effectively avoided. The solution of this application is applied to an application scenario of an open large world. The development of the large world has a more complex art scene, and provides a wide exploration space for players, and therefore is a trend in game development. As an important technology for developing large world applications, the PVS is key to reducing generation of invalid cells in a virtual scene and increasing distribution of valid cells. This objective can be achieved by using the solution of this application. Further, in some playing methods with relatively high degrees of freedom, there are some large regions in which a movement trajectory of a virtual character is not limited, that is, there is an unlimited scene. In this case, NavMesh cannot cover all character reachable regions, and a cell may be generated according to StaticMesh in the scene to cover all objects, terrains, and the like that the virtual character may contact in a game. In addition, the solution in this application is applied to limited scenes such as an indoor scene and a street, and a range in which the virtual character walks in these places is completely predictable. Specifically, in a multi-floor indoor scene, a character moves freely on each floor, but generally does not climb an indoor wall or window. Therefore, an invalid cell is generated in the wall or window region, and invalid computing is generated during PVS baking. Therefore, in this scene, the limited-view space including the indoor region is defined, and the priority of the limited-view space is set to the highest.

Although the operations are displayed sequentially according to the instructions of the arrows in the flowcharts, these operations are not necessarily performed sequentially according to the sequence instructed by the arrows. Unless explicitly specified in this application, execution of the operations is not strictly limited, and the operations may be performed in other sequences. Moreover, at least some of the operations in the flowchart may include a plurality of operations or a plurality of stages. The operations or stages are not necessarily performed at the same moment but may be performed at different moments. Execution of the operations or stages is not necessarily sequentially performed, but may be performed alternately with other operations or at least some of operations or stages of other operations.

Based on the same inventive concept, aspects of this application further provides a precomputed cell display apparatus for implementing the foregoing related precomputed cell display method. An implementation solution to the problem provided by the apparatus is similar to the implementation solution recorded in the foregoing method. Therefore, for specific limitations of the precomputed cell display apparatus provided below, reference may be made to the foregoing limitations on the precomputed cell display method.

Figure 17:
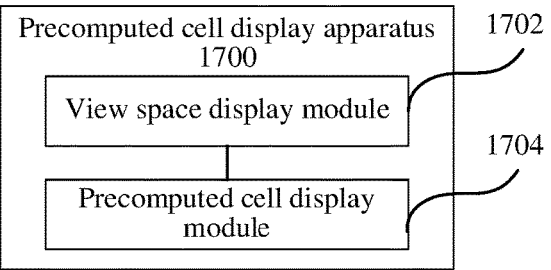
FIG. 17 is a structural block diagram of a precomputed cell display apparatus in accordance with one or more illustrative aspects discussed herein.

For example, as shown in FIG. 17, a precomputed cell display apparatus 1700 is provided, including: a view space display module 1702 and a precomputed cell display module 1704.

The view space display module 1702 is configured to display, in response to a view space division event triggered for a virtual scene in which a virtual character is located, a limited-view space and a full-view space that are obtained through division in the virtual scene; and the precomputed cell display module 1704 is configured to display, corresponding to a navigation mesh of a first space in the limited-view space, a plurality of precomputed cells that extend in a standing direction of the virtual character and that cover the navigation mesh, and Display, corresponding to a static mesh of a second space in the full-view space, a plurality of precomputed cells that extend in the standing direction of the virtual character and that cover the static mesh. The first space is a space that is within the limited-view space and that does not overlap with the full-view space; the second space is a space that is within the full-view space and that does not overlap with the limited-view space; the navigation mesh is configured for representing a reachable region of the virtual character in the limited-view space; and the static mesh is configured for representing an object contour of a static object in a space.

For example, the view space display module 1702 includes: a view space parameter display unit, configured to display at least two sets of view space parameters in response to a view space parameter input event. A view space display unit, configured to display at least two view spaces in the virtual scene according to the at least two sets of view space parameters, where a set of view space parameters are configured for representing a spatial position and a spatial type of one of the view spaces; and the spatial type includes a limited-view type and a full-view type.

For example, the view space parameters include a position parameter, a type parameter, and a shape parameter of the view space. In a situation of this aspect, the view space display unit is specifically configured to: display a view space in the virtual scene according to a position parameter, a type parameter, and a shape parameter in each set of view space parameters. A spatial position of the view space is a position represented by the position parameter, a spatial type of the view space is a type represented by the type parameter, and a spatial shape of the view space is a shape represented by the shape parameter.

For example, the view space display module 1702 is further configured to: display, corresponding to a navigation mesh or a static mesh in the overlapping space when an overlapping space exists between the limited-view space and the full-view space, a plurality of precomputed cells extending in the standing direction of the virtual character.

For example, the view space display module 1702 is specifically configured to: display respective priority parameters of the limited-view space and the full-view space in response to a priority parameter input event of a view space; display, corresponding to the navigation mesh in the overlapping space between the limited-view space and the full-view space if a priority of the limited-view space is higher than a priority of the full-view space, a plurality of precomputed cells that extend in the standing direction of the virtual character and that cover the navigation mesh of the overlapping space; and display, corresponding to the static mesh in the overlapping space if the priority of the full-view space is higher than the priority of the limited-view space, a plurality of precomputed cells that extend in the standing direction of the virtual character and that cover the static mesh of the overlapping space. The priorities are represented by the priority parameters.

For example, the view space display module 1702 is further configured to: display, corresponding to a movement trajectory mesh of the virtual character, a plurality of precomputed cells that extend in the standing direction of the virtual character and that cover the movement trajectory mesh. The movement trajectory mesh is configured for representing a movement trajectory of the virtual character moving off a ground in the virtual scene.

Based on the same inventive concept, aspects of this application further provides a precomputed cell generation apparatus for implementing the foregoing related precomputed cell generation method. An implementation solution to the problem provided by the apparatus is similar to the implementation solution recorded in the foregoing method.

Therefore, for specific limitations in one or more aspects of the precomputed cell generation apparatus provided below, reference may be made to the foregoing limitations on the precomputed cell generation method.

Figure 18:
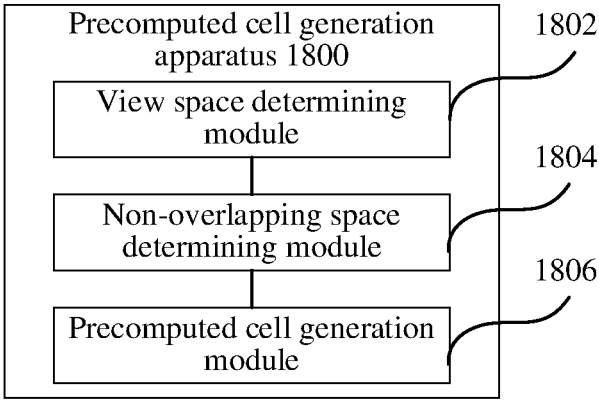
FIG. 18 is a structural block diagram of a precomputed cell generation apparatus V.

For example, as shown in FIG. 18, a precomputed cell generation apparatus 1800 is provided, including: a view space determining module 1802, a non-overlapping space determining module 1804, and a precomputed cell generation module 1806.

The view space determining module 1802 is configured to obtain view space parameters of a virtual scene in which a virtual character is located, and determine a limited-view space and a full-view space in the virtual scene;

the non-overlapping space determining module 1804 is configured to determine, according to respective positions of the limited-view space and the full-view space in the virtual scene, a first space that is within the limited-view space and that does not overlap with the full-view space and a second space that is within the full-view space and that does not overlap with the limited-view space; and the precomputed cell generation module 1806 is configured to generate, corresponding to a navigation mesh of a first space in the limited-view space, a plurality of precomputed cells that extend in a standing direction of the virtual character and that cover the navigation mesh, and Generate, corresponding to a static mesh of a second space in the full-view space, a plurality of precomputed cells that extend in the standing direction of the virtual character and that cover the static mesh. The navigation mesh is configured for representing a reachable region of the virtual character in the limited-view space; and the static mesh is configured for representing an object contour of a static object in a space.

For example, the view space determining module 1802 includes: a reachable range attribute parameter obtaining unit, configured to obtain reachable range attribute parameters of scene component elements in the virtual scene in which the virtual character is located, where the reachable range attribute parameters are configured for representing spatial reachability degrees of the virtual character in the scene composition elements, and the spatial reachability degrees include partial spatial reachability and full spatial reachability; a view space parameter generation unit, configured to generating view space parameters based on the reachable range attribute parameters and positions of the scene constituent elements in the virtual scene; and a view space determining unit, configured to determine, based on the view space parameters, a limited-view space including a limited-view element and a full-view space including a full-view element from the virtual scene, where a spatial reachability degree of the limited-view element is partial spatial reachability, and a spatial reachability degree of the full-view element is full spatial reachability.

For example, the view space parameters include a type parameter and a position parameter. In a situation of this aspect, the view space parameter generation unit is specifically configured to: determine a type parameter of a view space based on the reachable range attribute parameters, where the type parameter is configured for representing a spatial type of the view space, and the spatial type includes a limited-view type and a full-view type; and determine a position parameter of a view space based on the positions of the scene constituent elements in the virtual scene. The position parameter is configured for representing a spatial position of the view space in the virtual scene.

For example, the precomputed cell generation apparatus 1800 further includes: a priority parameter obtaining unit, configured to obtaining, when an overlapping space exists between the limited-view space and the full-view space, respective priority parameters of the limited-view space and the full-view space; a target view space determining unit, configured to determining, based on priorities respectively represented by the priority parameters, a target view space with a highest priority and a non-target view space other than the target view space from the limited-view space and the full-view space; and a deduplication unit, configured to delete a space in which the overlapping space is located from the non-target view space, to obtain a precomputed visibility space having a view space deduplicated, to generate a plurality of precomputed cells in the precomputed visibility space.

For example, the priority parameter includes a spatial priority parameter and a type priority parameter; and the priority includes a spatial priority represented by the spatial priority parameter and a type priority represented by the type priority parameter. In a situation of this aspect, the target view space determining unit is specifically configured to: determine a selected view space with a highest spatial priority in the limited-view space and the full-view space; determine the selected view space as a target view space if one selected view space exists; and determine, if a plurality of selected view spaces exist, a target view space with a highest type priority from the selected view spaces.

For example, the deduplication unit includes: an extension surface determining subunit, configured to determining, based on respective positions of the overlapping space and the non-target view space in the virtual scene, an extension surface of a boundary surface of the overlapping space in the non-target view space; a splitting subunit, configured to split the non-target view space based on the extension surface, to obtain a plurality of non-target subspaces corresponding to the non-target view space; and a deduplication subunit, configured to delete a coinciding subspace that coincides with the overlapping space from the non-target subspaces.

In a specific application, the overlapping space is a cuboid space, and the splitting subunit is specifically configured to: split the non-target view space based on a first extension surface of the overlapping space in the non-target view space, to obtain a first overlapping subspace that overlaps with the overlapping space and a first independent subspace that does not overlap with the overlapping space, where the first extension surface is an extension surface of a first boundary surface that is of the overlapping space and that is perpendicular to a direction of a first coordinate axis; split the first overlapping subspace based on a second extension surface of the overlapping space in the first overlapping subspace, to obtain a second overlapping subspace that overlaps with the overlapping space and a second independent subspace that does not overlap with the overlapping space, where the second extension surface is an extension surface of a second boundary surface that is of the overlapping space and that is perpendicular to a direction of a second coordinate axis; split the second overlapping subspace based on a third boundary surface that is of the overlapping space and that is perpendicular to a direction of a third coordinate axis, to obtain a coinciding subspace that coincides with the overlapping space and a third independent subspace that does not overlap with the overlapping space; and determine the first independent subspace, the second independent subspace, the coinciding subspace, and the third independent subspace as a plurality of non-target subspaces corresponding to the non-target view space.

For example, the precomputed cell generation module 1806 includes: a mesh plane determining unit, configured to determining a mesh plane of a target mesh in the virtual scene based on the standing direction of the virtual character in the virtual scene; the target mesh includes the navigation mesh of the first space in the limited-view space and the static mesh of the second space in the full-view space; a cell position parameter determining unit, configured to determining, according to position information of the mesh plane in the virtual scene and precomputed cell parameters, cell position parameters of a plurality of precomputed cells configured for covering the target mesh; and a precomputed cell generation unit, configured to generate, based on the cell position parameters, a plurality of precomputed cells that extend in the standing direction and that cover the target mesh. Adjacent precomputed cells do not overlap with each other.

For example, the precomputed cell parameters include grid formation of the precomputed cells and respective grid positions of grids configured for forming the precomputed cells in the virtual scene; and the cell position parameter includes a start position and a quantity. In a situation of this aspect, the cell position parameter determining unit includes: a height interval determination subunit, configured to determine, based on the position information of the mesh plane in the virtual scene, a planar projection region of the mesh plane on any coordinate plane of the virtual scene and a height interval of the mesh plane perpendicular to the coordinate plane; a target grid determining subunit, configured to determine, according to respective grid positions of the grids in the virtual scene, target grids that are of the grids and that match the planar projection region and the height interval; and a start position and quantity determining subunit, configured to determine, according to positions of the target grids in the virtual scene and the grid composition of the precomputed cells, a start position and a quantity of the plurality of precomputed cells configured for covering the target mesh. Each precomputed cell includes at least one of the target grids.

For example, the target grid determining subunit is specifically configured to: determine respective grid projection regions of the grids on the coordinate plane according to the respective grid positions of the grids in the virtual scene; determine, from the grid projection regions, a selected grid projection region whose overlapping area with the planar projection region satisfies an area condition; and determine a selected grid located within the height interval in the virtual scene as a target grid. A projection region of the selected grid on the coordinate plane is the selected grid projection region.

For example, the precomputed cell parameters include grid formation of the precomputed cells and respective grid positions of grids configured for forming the precomputed cells in the virtual scene; and the cell position parameters include respective cell position information of the precomputed cells in the virtual scene. In a situation of this aspect, the cell position parameter determining unit is specifically configured to: determine, based on the position information of the mesh plane in the virtual scene, respective planar projection regions of the mesh plane on any two coordinate planes of the virtual scene; determine, for each of the planar projection regions and according to the respective grid positions of the grids in the virtual scene, respective grid projection regions of the grids on a coordinate plane in which the planar projection region is located; determine, from the grid projection regions, target grid projection regions associated with the planar projection regions, and grid position information of a target grid jointly represented by the target grid projection regions; and determine, according to the grid position information and the grid formation of the precomputed cells, cell position information of each precomputed cell in the virtual scene in the plurality of precomputed cells configured for covering the target mesh. Each precomputed cell includes at least one of the target grids.

All or some of the modules in the foregoing precomputed cell display apparatus and the foregoing precomputed cell generation apparatus may be implemented by software, hardware, and a combination thereof. The foregoing modules may be built in or independent of a processor of a computer device in the form of hardware, or may be stored in a memory of the computer device in the form of software, so that the processor invokes and executes operations corresponding to the foregoing modules.

For example, a computer device is provided. The computer device may be a server, and has an internal structure diagram that may be shown in FIG. 19. The computer device includes one or more processors, a memory, an input/output (I/O) interface, and a communication interface. The processor, the memory, and the I/O interface are connected through a system bus, and the communication interface is connected to the system bus through the I/O interface. The processor of the computer device is configured to provide computing and control capabilities. The memory of the computer device includes a non-volatile storage medium and an internal memory. The non-volatile storage medium has an operating system, computer-readable instructions, and a database stored therein. The internal memory provides an environment for running of the operating system and the computer-readable instructions in the non-volatile storage medium. The database of the computer device is configured to store data involved in the foregoing method. The I/O interface of the computer device is configured to exchange information between the processor and an external device. The communication interface of the computer device is configured to connect and communicate with an external terminal through a network. The computer-readable instructions, when executed by the one or more processors, implement a precomputed cell display method or a precomputed cell generation method.

For example, a computer device is provided. The computer device may be a terminal, and has an internal structure diagram that may be shown in FIG. 20. The computer device includes one or more processors, a memory, an I/O interface, a communication interface, a display unit, and an input apparatus. The processor, the memory, and the I/O interface are connected through a system bus, and the communication interface, the display unit, and the input apparatus are connected to the system bus through the I/O interface. The processor of the computer device is configured to provide computing and control capabilities. The memory of the computer device includes a non-volatile storage medium and an internal memory. The non-volatile storage medium has an operating system and computer-readable instructions stored therein. The internal memory provides an environment for running of the operating system and the computer-readable instructions in the non-volatile storage medium. The I/O interface of the computer device is configured to exchange information between the processor and an external device. The communication interface of the computer device is configured to communicate with an external terminal in a wired or wireless manner. The wireless manner may be implemented through Wi-Fi, a mobile cellular network, near field communication (NFC), or another technology. The computer-readable instructions, when executed by the one or more processors, implement a precomputed cell display method or a precomputed cell generation method. The display unit of the computer device is configured to form a visually visible picture, and may be a display screen, a projection apparatus, or a virtual reality imaging apparatus. The display screen may be a liquid crystal display screen or an e-ink display screen. The input apparatus of the computer device may be a touch layer covering the display screen, or may be a button, a trackball, or a touchpad disposed on a housing of the computer device, or may be an external keyboard, touchpad, a mouse or the like.

Figure 19:
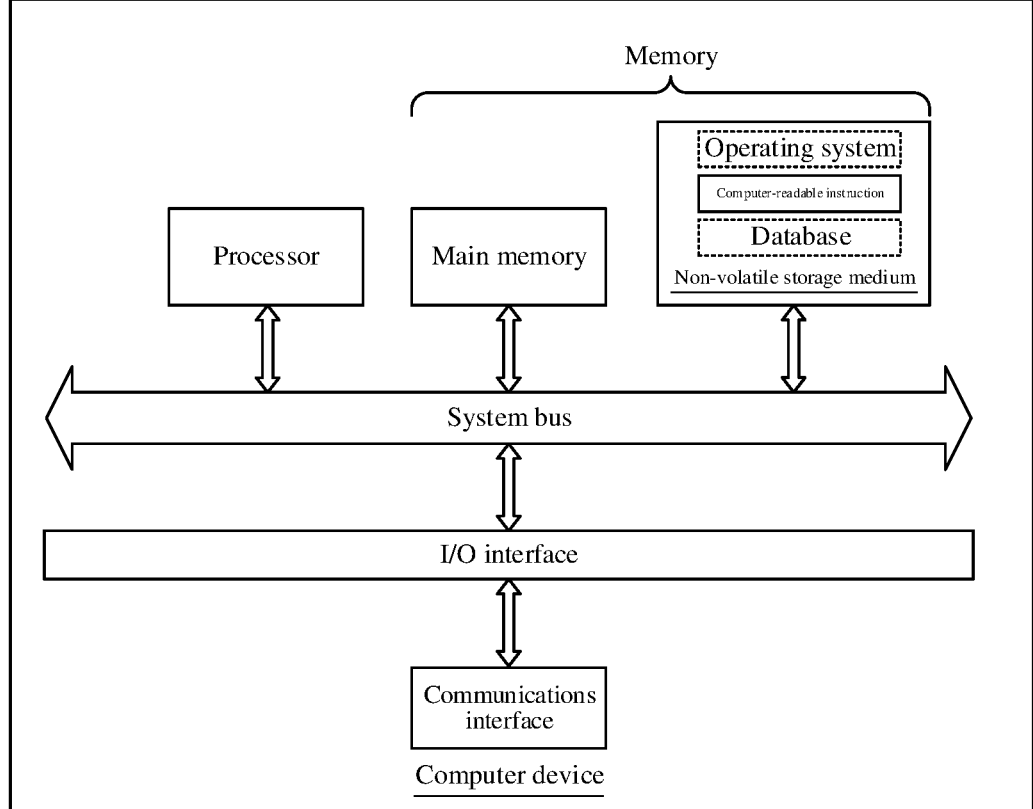
FIG. 19 is a diagram of an internal structure of a computer device in accordance with one or more illustrative aspects discussed herein.
Figure 20:
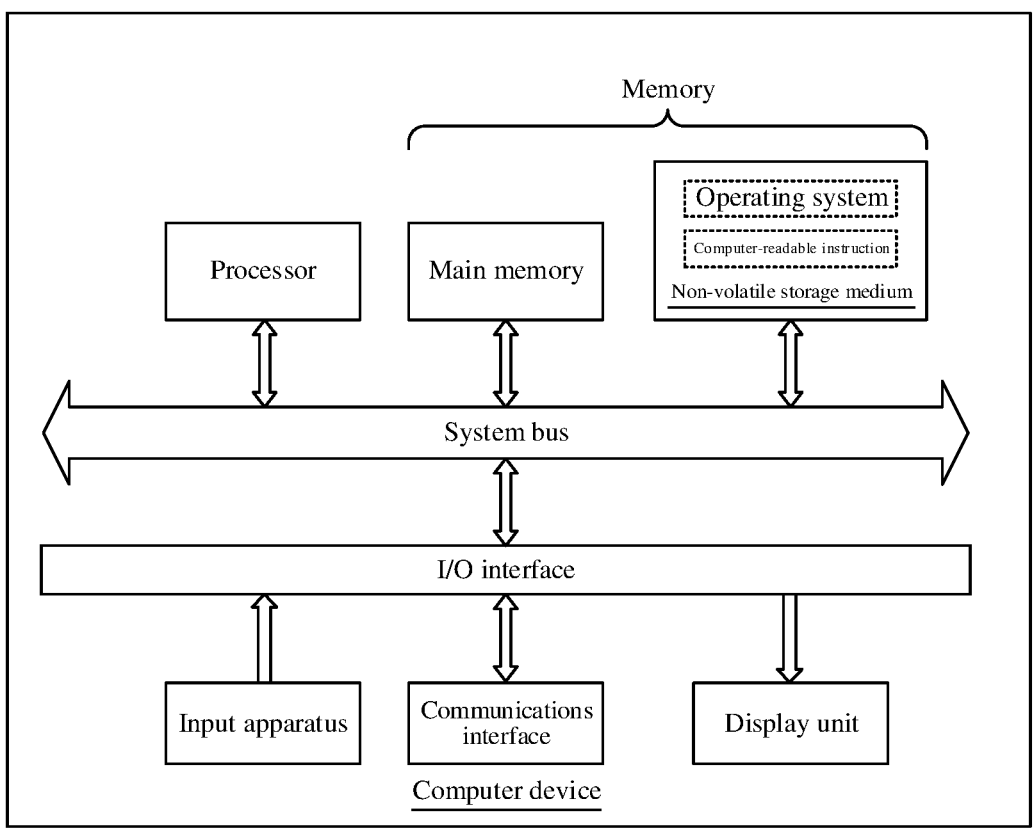
FIG. 20 is a diagram of an internal structure of a computer device in accordance with one or more illustrative aspects discussed herein.

Persons skilled in the art may understand that, the structures shown in FIG. 19 and FIG. 20 are merely block diagrams of partial structures related to a solution in this application, and does not form a limitation to the computer device to which the solution in this application is applied. Specifically, the computer device may include more or fewer components than those shown in the figure, or have some components combined, or have a different component deployment.

For example, a computer device is provided, comprising a memory and one or more processors. The memory has computer-readable instructions stored therein, and the one or more processors, when executing the computer-readable instructions, implements the operations of the foregoing methods.

For example, a computer-readable storage medium is provided and has computer-readable instructions stored therein, and the computer-readable instructions, when executed by one or more processors, implement the operations of the foregoing methods.

For example, a computer program product is provided and includes computer-readable instructions, and the computer-readable instructions, when executed by one or more processors, implement the operations of the foregoing methods.

User information (including but not limited to user equipment information, user personal information, and the like) and data (including but not limited to data for analysis, stored data, displayed data, and the like) involved in this application are all information and data authorized by users or fully authorized by all parties, and collection, use, and processing of relevant data need to comply with relevant laws, regulations, and standards of relevant countries and regions.

Persons of ordinary skill in the art may understand that all or some of the procedures of the methods in the foregoing aspects may be implemented by a computer-readable instruction instructing relevant hardware. The computer-readable instruction may be stored in a non-volatile computer-readable storage medium. When the computer-readable instruction runs, the procedures of the foregoing method aspects are performed. Any reference to a memory, a database, or another medium used in the various aspects provided herein can include at least one of a non-volatile and a volatile memory. The non-volatile memory may include a Read-Only Memory (ROM), a magnetic tape, a floppy disk, a flash memory, an optical memory, a high-density embedded non-volatile memory, a resistive random access memory (ReRAM), a magnetoresistive random access memory (MRAM), a ferroelectric random access memory (FRAM), a phase change memory (PCM), a graphene memory, or the like. The volatile memory may include a random access memory (RAM) or an external cache. As an illustration rather than a limitation, the RAM is available in various forms, such as a static random access memory (SRAM) or a dynamic random access memory (DRAM). The database involved in the aspects provided in this application may include at least one of a relational database and a non-relational database. The non-relational database may include a blockchain-based distributed database, or the like, but is not limited thereto. The processor involved in the aspects provided in this application may be a general-purpose processor, a central processing unit, a graphics processing unit, a digital signal processor, a programmable logic device, a quantum computing-based data processing logic device, or the like, but is not limited thereto.

The technical features in the foregoing examples may be randomly combined. For concise description, not all possible combinations of the technical features are described. However, the combinations of the technical features are all to be considered as falling within the scope described in this specification provided that they do not conflict with each other.

The foregoing description shows several implementations of this application and are described in detail, but they are not to be construed as a limit to the patent scope of this application. Persons of ordinary skill in the art may further make variations and improvements without departing from the ideas of this application, which shall fall within the protection scope of this application. Therefore, the protection scope of this application is to be subject to the appended claims.

What is claimed is:

1. A method comprising:
generating, by a computing device, in a virtual scene, and in response to a view space division event triggered by the virtual scene in which a virtual character is located, at least one limited-view space and a full-view space;
generating, corresponding to a navigation mesh of a first space in the limited-view space, a plurality of first precomputed cells that extend in a standing direction of the virtual character and cover the navigation mesh, wherein the first space is a space, within the limited-view space, that does not overlap with the full-view space, and wherein the navigation mesh is configured to represent a reachable region, of the virtual character, in the limited-view space; and
generating, corresponding to a static mesh of a second space in the full-view space, a plurality of second precomputed cells that extend in the standing direction of the virtual character and cover the static mesh, wherein the second space is a space, within the full-view space, that does not overlap with the limited-view space, and wherein the static mesh is configured to represent an object contour of a static object in space.

2. The method according to claim 1, wherein the generating the at least one limited-view space and the full-view space comprises:
generating, in response to a view space parameter input event, at least two sets of view space parameters; and
generating, according to the at least two sets of view space parameters, at least two view spaces in the virtual scene, wherein each of the at least two sets of view space parameters represents a spatial position and a spatial type of a respective one of the at least two view spaces, and wherein the spatial type comprises a limited-view type and a full-view type.

3. The method according to claim 2, wherein each one of the at least two sets of view space parameters comprise a position parameter, a type parameter, and a shape parameter of the respective view space; and
the generating the at least two view spaces comprises:
generating a respective view space according to the position parameter, the type parameter, and the shape parameter in each set of view space parameters, wherein the spatial position of the respective view space is a position represented by the position parameter, the spatial type of the respective view space is a type represented by the type parameter, and the spatial shape of the respective view space is a shape represented by the shape parameter.

4. The method according to claim 1, further comprising:

generating, corresponding to the navigation mesh or the static mesh in an overlapping space between the at least one limited-view space and the full-view space, a plurality of third precomputed cells extending in the standing direction of the virtual character.

5. The method according to claim 4, wherein the generating the plurality of third precomputed cells comprises:

generating, in response to a priority parameter input event of a view space, priority parameters of the at least one limited-view space and priority parameters of the full-view space;

generating, based on the navigation mesh in the overlapping space and that a priority of the at least one limited-view space is higher than a priority of the full-view space, a plurality of fourth precomputed cells that extend in the standing direction of the virtual character and cover the navigation mesh of the overlapping space; or generating, corresponding to the static mesh in the overlapping space and that the priority of the full-view space is higher than the priority of the limited-view space, a plurality of fifth precomputed cells that extend in the standing direction of the virtual character and that cover the static mesh of the overlapping space.

6. The method according to claim 5, further comprising:

generating, corresponding to a movement trajectory mesh of the virtual character, a plurality of sixth precomputed cells that extend in the standing direction of the virtual character and cover the movement trajectory mesh, wherein the movement trajectory mesh is configured for representing a movement trajectory of the virtual character moving off a ground in the virtual scene.

7. A method comprising:

obtaining, by a computing device, view space parameters of a virtual scene in which a virtual character is located;

determining, in the virtual scene, at least one limited-view space and a full-view space;

according to respective positions of the at least one limited-view space and the full-view space in the virtual scene, determining:

a first space that is within the at least one limited-view space and does not overlap with the full-view space; and a second space that is within the full-view space and does not overlap with the at least one limited-view space;

generating, corresponding to a navigation mesh of the first space, a plurality of first precomputed cells that extend in a standing direction of the virtual character and cover the navigation mesh, wherein the navigation mesh is configured for representing a reachable region, of the virtual character, in the at least one limited-view space; and generating, corresponding to a static mesh of the second space, a plurality of second precomputed cells that extend in the standing direction of the virtual character and cover the static mesh, wherein the static mesh is configured for representing an object contour of a static object in space.

8. The method according to claim 7, wherein the obtaining the view space parameters comprises:

obtaining reachable range attribute parameters of scene component elements in the virtual scene in which the virtual character is located, wherein the reachable range attribute parameters are configured for representing spatial reachability degrees of the virtual character in the scene constituent elements, and the spatial reachability degrees comprise partial spatial reachability and full spatial reachability; and generating the view space parameters based on the reachable range attribute parameters and positions of the scene constituent elements in the virtual scene; and wherein the determining the at least one limited-view space and the full-view space comprises:

determining, from the virtual scene and based on the view space parameters, the limited-view space, each comprising a limited-view element, and a full-view space comprising a full-view element, wherein a spatial reachability degree of the at least one limited-view element is partial spatial reachability, and wherein a spatial reachability degree of the full-view element is full spatial reachability.

9. The method according to claim 8, wherein the view space parameters comprise a type parameter and a position parameter; and wherein the generating the view space parameters comprises:

determining the type parameter of at least one view space based on the reachable range attribute parameters, wherein the type parameter is configured for representing a spatial type of the at least one view space, and wherein the spatial type comprises a limited-view type and a full-view type; and determining the position parameter of the at least one view space based on the positions of the scene constituent elements in the virtual scene, wherein the position parameter is configured for representing a spatial position of the at least one view space in the virtual scene.

10. The method according to claim 7, wherein the at least one limited-view space comprises two or more limited-view spaces, and wherein the method further comprising:

obtaining, based on an overlapping space between the at least one limited-view space and the full-view space, respective priority parameters of the at least one limited-view space and the full-view space;

determining, from the at least one limited-view space and based on priorities respectively represented by the respective priority parameters, a target view space and a non-target view space, wherein the target view space has a highest priority among the two or more limited-view spaces; and deleting a space in which the overlapping space is located from the non-target view space, to obtain a precomputed visibility space having a view space deduplicated, to generate precomputed cells in the precomputed visibility space.

11. The method according to claim 10, wherein the respective priority parameters comprise a spatial priority parameter and a type priority parameter; and the highest priority comprises a spatial priority represented by the spatial priority parameter and a type priority represented by the type priority parameter.

12. The method according to claim 10, wherein the deleting the space comprises:

determining, based on respective positions of the overlapping space and the non-target view space in the virtual scene, an extension surface on a boundary surface of the overlapping space in the non-target view space;

splitting the non-target view space based on the extension surface;

obtaining, based on the splitting, a plurality of non-target subspaces corresponding to the non-target view space; and deleting a coinciding subspace that coincides with the overlapping space from the non-target subspaces.

13. The method according to claim 12, wherein the overlapping space is a cuboid space; and wherein the splitting the non-target view space comprises:

splitting the non-target view space based on a first extension surface of the overlapping space in the non-target view space;

obtaining, based on the splitting, a first overlapping subspace that overlaps with the overlapping space and a first independent subspace that does not overlap with the overlapping space, wherein the first extension surface is an extension surface of a first boundary surface that is of the overlapping space and that is perpendicular to a direction of a first coordinate axis;

splitting the first overlapping subspace based on a second extension surface of the overlapping space in the first overlapping subspace;

obtaining a second overlapping subspace that overlaps with the overlapping space and a second independent subspace that does not overlap with the overlapping space, wherein the second extension surface is an extension surface of a second boundary surface that is of the overlapping space and that is perpendicular to a direction of a second coordinate axis;

splitting the second overlapping subspace based on a third boundary surface that is of the overlapping space and that is perpendicular to a direction of a third coordinate axis;

obtaining a coinciding subspace that coincides with the overlapping space and a third independent subspace that does not overlap with the overlapping space; and determining the first independent subspace, the second independent subspace, the coinciding subspace, and the third independent subspace as a plurality of non-target subspaces corresponding to the non-target view space.

14. The method according to claim 7, wherein the generating the plurality of first precomputed cells comprises:

determining a mesh plane of a target mesh in the virtual scene based on the standing direction of the virtual character in the virtual scene, wherein the target mesh comprises the navigation mesh of the first space in the limited-view space and the static mesh of the second space in the full-view space;

determining, according to position information of the mesh plane in the virtual scene and precomputed cell parameters, cell position parameters of a plurality of precomputed cells configured for covering the target mesh; and generating, based on the cell position parameters, a plurality of precomputed cells that extend in the standing direction and that cover the target mesh, wherein adjacent precomputed cells do not overlap with each other.

15. The method according to claim 14, wherein the precomputed cell parameters comprise grid formation of precomputed cells and respective grid positions of grids configured for forming the precomputed cells in the virtual scene;

wherein the cell position parameter comprises a start position and a quantity; and wherein the determining the plurality of precomputed cells configured for covering the target mesh comprises:

determining, based on the position information of the mesh plane in the virtual scene, a planar projection region of the mesh plane on a coordinate plane of the virtual scene and a height interval of the mesh plane perpendicular to the coordinate plane;

determining, according to respective grid positions of the grids in the virtual scene, target grids that are of the grids and that match the planar projection region and the height interval; and determining, according to positions of the target grids in the virtual scene and the grid formation of the precomputed cells, a start position and a quantity of the plurality of precomputed cells configured for covering the target mesh, wherein each of the precomputed cells comprises at least one of the target grids.

16. The method according to claim 15, wherein the determining the target grids comprises:

determining respective grid projection regions of the grids on the coordinate plane according to the respective grid positions of the grids in the virtual scene;

determining, from the grid projection regions, a selected grid projection region whose overlapping area with the planar projection region satisfies an area condition; and determining a selected grid located within the height interval in the virtual scene as a target grid, wherein a projection region of the selected grid on the coordinate plane is the selected grid projection region.

17. The method according to claim 14, wherein the precomputed cell parameters comprise grid formation of the corresponding precomputed cells and respective grid positions of grids configured for forming the precomputed cells in the virtual scene; and the cell position parameters comprise respective cell position information of the corresponding precomputed cells in the virtual scene; and wherein the determining the cell position parameters of a plurality of precomputed cells configured for covering the target mesh comprises:

determining, based on the position information of the mesh plane in the virtual scene, respective planar projection regions of the mesh plane on two coordinate planes of the virtual scene;

determining, for each of the planar projection regions and according to the respective grid positions of the grids in the virtual scene, respective grid projection regions of the grids on a coordinate plane in which the planar projection region is located;

determining, from the grid projection regions, target grid projection regions associated with the planar projection regions, and grid position information of a target grid jointly represented by the target grid projection regions; and determining, according to the grid position information and the grid formation of the precomputed cells, cell position information of each precomputed cell in the virtual scene in the plurality of precomputed cells configured for covering the target mesh, wherein each of the precomputed cells comprises at least one of the target grids.

18. A precomputed cell display apparatus comprising:

one or more processors; and memory storing instructions, when executed by the one or more processors, configure the apparatus to perform actions comprising:

generating, in a virtual scene, and in response to a view space division event triggered by the virtual scene in which a virtual character is located, at least one limited-view space and a full-view space;

generating, corresponding to a navigation mesh of a first space in the limited-view space, a plurality of first precomputed cells that extend in a standing direction of the virtual character and cover the navigation mesh, wherein the first space is a space, within the limited-view space, that does not overlap with the full-view space, and wherein the navigation mesh is configured to represent a reachable region, of the virtual character, in the limited-view space; and generating, corresponding to a static mesh of a second space in the full-view space, a plurality of second precomputed cells that extend in the standing direction of the virtual character and cover the static mesh, wherein the second space is a space, within the full-view space, that does not overlap with the limited-view space, and wherein the static mesh is configured to represent an object contour of a static object in space.

19. A precomputed cell generation apparatus comprising:

one or more processors; and memory storing instructions, when executed by the one or more processors, configure the apparatus to perform actions comprising:

obtaining view space parameters of a virtual scene in which a virtual character is located;

determining, in the virtual scene, at least one limited-view space and a full-view space;

according to respective positions of the at least one limited-view space and the full-view space in the virtual scene, determining:

a first space that is within the at least one limited-view space and does not overlap with the full-view space; and a second space that is within the full-view space and does not overlap with the at least one limited-view space;

generating, corresponding to a navigation mesh of the first space, a plurality of first precomputed cells that extend in a standing direction of the virtual character and cover the navigation mesh, wherein the navigation mesh is configured for representing a reachable region, of the virtual character, in the at least one limited-view space; and generating, corresponding to a static mesh of the second space, a plurality of second precomputed cells that extend in the standing direction of the virtual character and that cover the static mesh, wherein the static mesh is configured for representing an object contour of a static object in space.

20. A non-transitory computer-readable storage medium storing computer-readable instructions that, when executed, cause performance of actions comprising:

generating, in a virtual scene, and in response to a view space division event triggered by the virtual scene in which a virtual character is located, at least one limited-view space and a full-view space;

generating, corresponding to a navigation mesh of a first space in the limited-view space, a plurality of first precomputed cells that extend in a standing direction of the virtual character and cover the navigation mesh, wherein the first space is a space, within the limited-view space, that does not overlap with the full-view space, and wherein the navigation mesh is configured to represent a reachable region, of the virtual character, in the limited-view space; and generating, corresponding to a static mesh of a second space in the full-view space, a plurality of second precomputed cells that extend in the standing direction of the virtual character and cover the static mesh, wherein the second space is a space, within the full-view space, that does not overlap with the limited-view space, and wherein the static mesh is configured to represent an object contour of a static object in space.

* * * * *